(12) United States Patent
Banno et al.

(10) Patent No.: US 6,318,638 B1
(45) Date of Patent: Nov. 20, 2001

(54) HOT AND COLD WATER MIXING DEVICE

(75) Inventors: Michio Banno; Mamoru Hashimoto; Toshio Kawachi, all of Aichi (JP)

(73) Assignee: Inax Corporation, Tokoname (JP)

( * ) Notice: Subject to any disclaimer, the term of this patent is extended or adjusted under 35 U.S.C. 154(b) by 0 days.

(21) Appl. No.: 09/582,106

(22) PCT Filed: Sep. 10, 1999

(86) PCT No.: PCT/JP99/04916

§ 371 Date: Jun. 22, 2000

§ 102(e) Date: Jun. 22, 2000

(87) PCT Pub. No.: WO01/20210

PCT Pub. Date: Mar. 22, 2001

(51) Int. Cl.[7] .................................................. G05D 23/13
(52) U.S. Cl. .................................................. 236/12.2
(58) Field of Search ................................ 236/12.16, 12.2

(56) References Cited

U.S. PATENT DOCUMENTS

| | | | |
|---|---|---|---|
| 5,400,961 | * | 3/1995 | Tsutsui et al. .................. 236/12.2 |
| 5,806,761 | * | 9/1998 | Enoki et al. .................... 236/12.2 |
| 5,984,195 | * | 11/1999 | Benedict ......................... 236/12.2 |

FOREIGN PATENT DOCUMENTS

| | | |
|---|---|---|
| 61-49545 | 10/1986 | (JP) . |
| 2-16880 | 2/1990 | (JP) . |
| 2-195085 | 8/1990 | (JP) . |
| 5-20635 | 3/1993 | (JP) . |
| 6-147333 | 5/1994 | (JP) . |
| 7-36221 | 8/1995 | (JP) . |
| 8-42744 | 2/1996 | (JP) . |
| 2511781 | 7/1996 | (JP) . |
| 8-285128 | 11/1996 | (JP) . |
| 9-21478 | 1/1997 | (JP) . |
| 9-42493 | 2/1997 | (JP) . |

\* cited by examiner

*Primary Examiner*—William E. Tapolcai
(74) *Attorney, Agent, or Firm*—Kanesaka & Takeuchi

(57) ABSTRACT

In a hot and cold water mixing device, the slope in a medium-temperature range is gently, and the slopes in a low-temperature range and a high-temperature range are steep. When the target temperature of water mixture is set in the medium-temperature range, a combined biasing force of serially-arranged bias springs acts on a main shaft leftwards, a biasing force of a temperature-sensitive spring acts on the main shaft rightwards, and these biasing forces balance with each other so that the main shaft and valve elements are stopped. When a handle is turned to enter into the high-temperature range exceeding, e.g. 50° C., a slide shaft biases the main shaft leftwards only with the second bias spring. When the handle is turned to enter into the low-temperature range, e.g. below 30° C., the slide shaft biases the main shaft only with the first bias spring leftwards.

25 Claims, 18 Drawing Sheets

[WHEN DISCHARGING MEDIUM-TEMPERATURE WATER MIXTURE]

[WHEN DISCHARGING HIGH-TEMPERATURE WATER MIXTURE]

[WHEN DISCHARGING LOW-TEMPERATURE WATER MIXTURE]

Fig. 5a
Fig. 5b
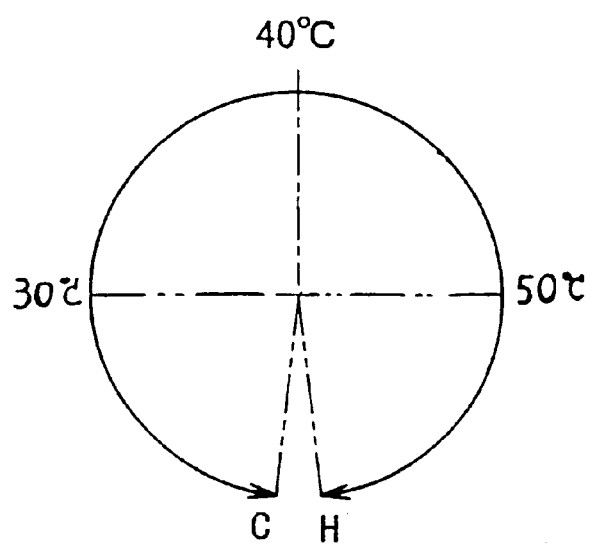
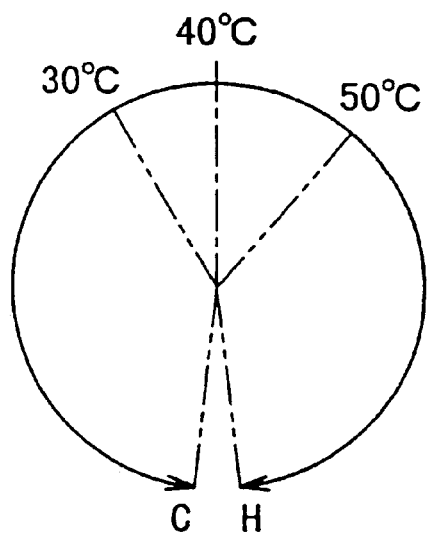

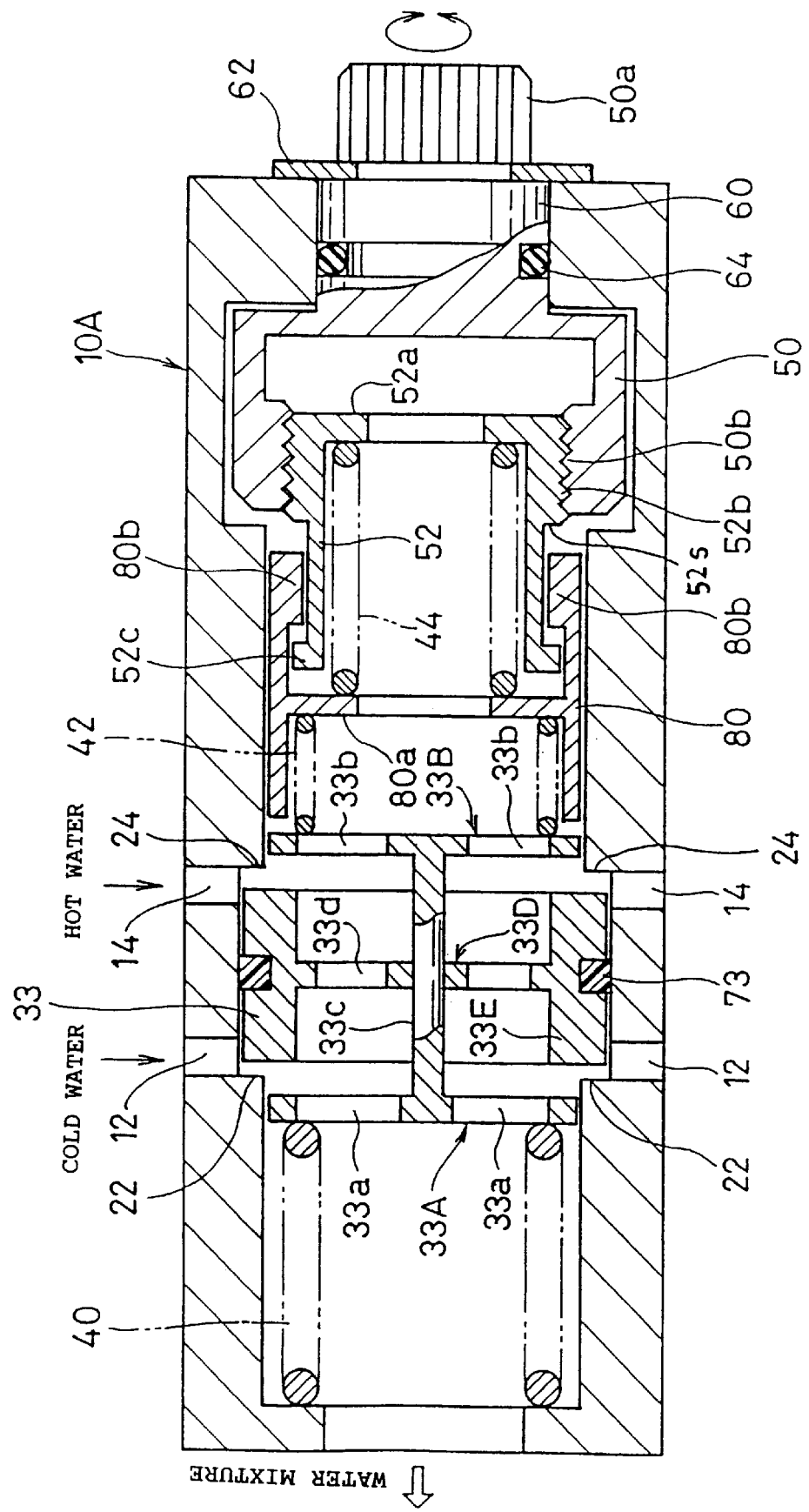

Fig.18A  Fig.18B
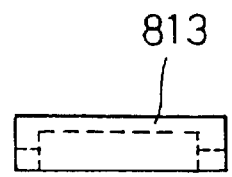
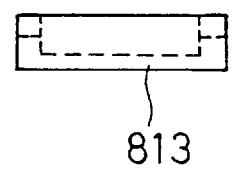
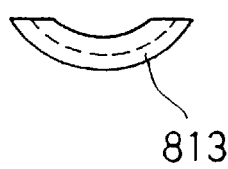
Fig.19
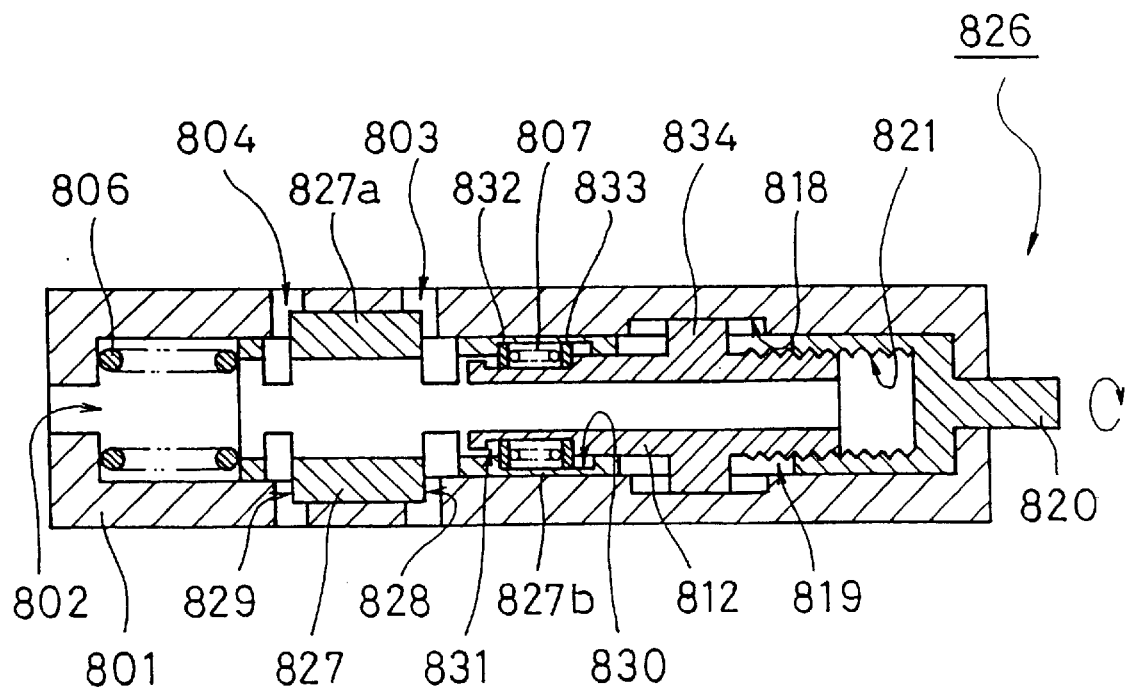

HOT AND COLD WATER MIXING DEVICE

FIELD OF THE INVENTION

The present invention relates to a hot and cold water mixing device, and more particularly to a hot and cold water mixing device of a thermostatic type in which a movable valve element is pressed from both sides by a bias spring and a temperature-sensitive spring made of shape memory material.

In addition, the present invention relates to a control mechanism for hot and cold water mixing device which can control in such a manner that, in a low-temperature range where the spring constant of a temperature-sensitive spring made of a shape memory alloy is extremely reduced, a bias spring functions as a member for softening the operation force acting on a valve element for closing the valve after the valve element is seated and that the valve element is biased in a direction of closing a hot water port by a regulating member so that the hot water port can be forcedly closed for discharging only cold water.

DESCRIPTION OF THE RELATED ART

As a hot and cold water mixing device of thermostatic type, a device employing a temperature-sensitive spring made of a shape memory material such as a shape memory alloy is publicly known. As disclosed in Japanese patent application H06-147333, a hot and cold water mixing device of this type comprises a cylindrical valve body in which a cold water valve seat and a hot water valve seat are arranged, a valve element which can reciprocate in an axial direction of the valve body and is allowed to come in contact with the cold water valve seat and the hot water valve seat, a temperature-sensitive spring for biasing the valve element in a direction toward the hot water valve seat, a bias spring for biasing the valve element in a direction toward the cold water valve seat, and a temperature regulating handle for moving the bias spring.

By selectively turning the temperature regulating handle, the bias spring is moved in forward and rearward axial directions so as to vary the force applied by the bias spring biasing the valve element, thereby changing the preset target temperature of water mixture.

That is, the rearward movement of the bias spring reduces the force applied by the bias spring so that the valve element comes closer to the hot water valve seat and moves apart from the cold water valve seat, thereby lowering the preset target temperature. To the contrary, the forward movement of the bias spring increases the force applied by the bias spring so that the valve element moves apart from the hot water valve seat and comes closer to the cold water valve seat, thereby rising the preset target temperature. When the temperature of water mixture becomes different from the preset target temperature due to a variation in the temperature of supplied hot water and/or a fluctuation of the supply pressure of hot water in a state where water mixture of a preset target temperature is discharged, the temperature-sensitive spring expands or contracts to shift the valve element so that the temperature of water mixture is automatically recovered to a preset target temperature.

In the conventional hot and cold water mixing device, the relation between the turning angle of the temperature regulating handle and the travel of the valve element is substantially straight and is represented by a broken line in FIG. 4. That is, for example, the travel of the valve element per a unit turning angle of the temperature regulating handle is substantially uniform in any of a low-temperature range below 30° C., a medium-temperature range from 30° C. to 50° C., and a high-temperature range above 50° C. The relation between the turning angle of the temperature regulating handle and the temperature of water mixture to be discharged is substantially straight in the overall range from the low-temperature range to the high-temperature range.

In general, a faucet with a hot and cold water mixing device is desired to have a wider indication range for the medium-temperature range from 30° C. to 50° C., as shown in FIG. 5a, allowing the fine control for water mixture in the medium-temperature range from 30° C. to 50° C., particularly, from 35° C. to 45° C. For this, the slope of a line (the slope of the line in FIG. 4) representing the relation between the turning angle of the temperature regulating handle and the temperature of water mixture in the medium-temperature range from 30° C. to 50° C. should be gentle. However, to make the slope simply entirely gentle, a significantly large turning range of the temperature regulating handle is required for allowing the temperature control from the low-temperature range to the high-temperature range. In case of the temperature-regulating handle of a turning-type, the turning range of the handle (C–H: when the handle is at C, only cold water through a cold water supply pipe is discharged, while when the handle is at H, only hot water through a hot water supply pipe is discharged) should be 360° or less (normally, 270° or less). Accordingly, making the slope simply entirely gentle as mentioned above can not be employed actually (because the range C–H should be over 360°). This is the reason why the conventional faucet has a small indication range for the medium-temperature range from 30° C. to 50° C., as shown in FIG. 5b.

The present invention is made taking such a technical problem into consideration and a first object of the present invention is therefore to provide a hot and cold water mixing device in which the slope in the medium-temperature range is gentle and the slope in the low-temperature range and the high-temperature range is steep, so that a faucet with this hot and cold water mixing device has a wide indication range for the medium-temperature range.

A control mechanism of the conventional hot and cold water mixing device will be described with reference to FIG. 20. A valve casing 801 has an inner cavity 802 passing through the center of the valve casing 801 for forming flow passages, and a hot water port 803 and a cold water port 804 formed in a circumferential wall of the valve casing 801. A spool valve element 805 is fitted slidably in the axial direction of the valve casing 801 for defining the flow rates of hot water and cold water by controlling the ratio of opening areas of the ports 803 and 804. The spool valve element 805 comprises a hot water valve element 805a and a cold water valve element 805b integrally connected and is biased by a temperature-sensitive spring 806 made of a shape memory alloy in a rightward direction and biased by a bias spring 807 in a leftward direction in this figure. The rightward and leftward directions are opposite to each other so that the spool valve element 805 is stopped at a position where the springs 806 and 807 balance with each other. One end of the bias spring 807 is supported by a plug member 808 so that the biasing forces of the springs 806 and 807 can be varied by moving the plug member 808 in the axial direction. According to the varied biasing forces of the springs 806 and 807, the position of the spool valve element 805 is changed and the flowing rate between hot water and cold water are thus changed, thereby changing the temperature of water mixture.

For instance, in a state that the spool valve element 805 is stopped at a preset position where the springs 806 and 807 balance, the supply pressure of hot water or cold water fluctuates so that the flowing ratio between hot water and cold water relative to the same opening area is varied, changing the temperature of obtained water mixture. The temperature-sensitive spring 806 senses such variation and works. That is, the temperature-sensitive spring 806 works as an automatically temperature regulating function by changing its biasing force corresponding to the temperature of obtained water mixture in such a manner as to move the spool valve element 805 in such a direction of correcting the temperature.

Normally in a hot and cold water mixing device with an automatically temperature regulating function, when only cold water is discharged, the position of the spool valve element 805 in the axial direction should be controlled by the balance between the biasing forces of the temperature-sensitive spring 806 and the bias spring 807 such that the hot water valve element 805a of the spool valve element 805 is seated on a hot water valve seat.

However, according to the control mechanism of the hot and cold water mixing device using the temperature-sensitive spring 806 made of a shape memory alloy, the spring constant of the temperature-sensitive spring 806 decreases with decreasing temperature of water mixture and the force applied by the temperature-sensitive spring 806 is thus reduced. Accordingly, when operation for discharging only cold water is performed, the force biasing the spool valve element 805 may be too poor to completely close the hot water port 803, thus allowing the enter of hot water. Therefore, the hot and cold water mixing device using the temperature-sensitive spring 806 has a problem of not discharging completely only cold water.

To solve this problem, the spring constant of the temperature-sensitive spring 806 is previously set relatively large. In this case, when operation for discharging only cold water is performed, the temperature-sensitive spring 806 can close the hot water port 803 against the biasing force of the bias spring 807. However, to previously set the spring constant of the temperature-sensitive spring 806 relatively large, the entire size of the hot and cold water mixing device must be large, also causing a problem of increasing the cost. There is an alternative measure that the spool valve element 805 is seated on the hot water valve seat directly by a member for adjusting the biasing force of the bias spring 807. However, the mechanical connection between the member and the spool valve element 805 brings another problem in the closing operation after the spool valve element 805 is seated on the hot water valve seat, that the operational force directly acts on the spool valve element 805 so that a force destroying the spool valve element 805 may be exerted on the spool valve element 805.

Therefore, a second object of the present invention is to provide a control mechanism of a hot and cold water mixing device in which a hot water valve element is forcedly seated on a hot water valve seat by using a member varying the biasing force of a bias spring in a low-temperature range, the force acting on the valve element is buffered by the bias spring while allowing the valve element to be seated, and the bias spring further biases the valve element in a direction of closing a hot water port.

SUMMARY OF THE INVENTION

A hot and cold water mixing device according to first to eighteenth aspects accomplishes the aforementioned first object of this invention.

A hot and cold water mixing device according to the first aspect comprises: a cylindrical valve body having a cold water valve seat and a hot water valve seat; a valve element which is slidable in the axial direction of said valve body and which can be seated on said cold water valve seat and said hot water valve seat; a temperature-sensitive spring for biasing said valve element in a direction toward said hot water valve seat; a bias spring for biasing said valve element in a direction toward said cold water valve seat; and a temperature setting member for moving said bias spring in the axial direction of said valve body. The mixing device further comprises a biasing force changing means for changing the biasing force of said bias spring so that the biasing force when said valve element is positioned in a range for discharging medium-temperature water mixture differs from the biasing force when said valve element is positioned in a range for discharging low-temperature water mixture or a range for discharging high-temperature water mixture.

In this hot and cold water mixing device according to this invention, the biasing force of the bias springs can be changed so that the slope of a temperature line in the medium-temperature range becomes gentle.

According to the second aspect of the present invention, a plurality of bias springs are provided as said bias spring, and said biasing force changing means controls such that the biasing force of only a part of said bias springs acts on said valve element when the valve element is positioned in the range for discharging low-temperature water mixture or the range for discharging high-temperature water mixture and that the biasing force of all of said bias springs serially acts on said valve element when the valve element is positioned in the range for discharging medium-temperature water mixture.

In this hot and cold water mixing device, when the target temperature of water mixture is set in the low-temperature range or the high-temperature range, the biasing force of only a part of the bias springs acts on the valve element, while when the target temperature of water mixture is set in the medium-temperature range, the biasing force generated by the first and second bias springs which are serially connected acts on the valve element.

As well known in the art, when, the combined spring constant of serially connected springs becomes a harmonic average of the spring constants of the respective springs so that the serially combined spring constant should be smaller than one of the respective spring constants. Therefore, according to the hot and cold water mixing device of the present invention according to the second aspect, the biasing force of the biasing springs when the target temperature is set in the medium-temperature range is small so that the slope indicating the travel of the valve element (i.e. the temperature of water mixture) relative to the turning angle of the temperature regulating handle is gentle, thus facilitating the fine control for setting the target temperature of water mixture.

When the target temperature is set in the low-temperature range or the high-temperature range, the biasing force of the bias springs is larger and therefore the slope is steeper than that in case of the medium-temperature range. Therefore, a wider rotation range for the medium-temperature range can be obtained without increasing the entire rotation range of the temperature regulating handle.

In an embodiment of the third aspect of the hot and cold water mixing device, according to the second aspect, said valve element is supported by a main shaft arranged coaxially with said valve body, said main shaft being slidable in the axial direction of said valve body; wherein said temperature setting member comprises: a rotational shaft arranged coaxially with said main shaft and having internal thread formed in the inner surface thereof, a cylindrical slide shaft arranged coaxially with said main shaft and having external thread to be engaged with said internal thread; a distal end collar and a proximal end collar formed on a distal end and a proximal end of said slide shaft, respectively, the distal end being apart from the valve element and the proximal end being near the valve element; a hook which is axially movably coupled to said slide shaft, and is prevented from moving in a direction toward the valve element when engaged with said proximal end collar; and a slide ring which is axially movably coupled to said main shaft and disposed between said hook and the valve element in such a manner as to be in contact with a collar-like stopper disposed on a middle portion in the longitudinal direction of said main shaft and to be in contact with said hook. The mixing device further comprises a first bias spring disposed between said slide ring and the valve element in the compressed state, and a second bias spring disposed between said hook and the distal end collar in the compressed state.

As stated in the fourth aspect, this changing means may comprise: said main shaft extending from said valve element; a flange-like stopper disposed on the end of said main shaft; said collar-like stopper disposed on the middle portion of said main shaft; a stopper ring biased by said second bias spring in a direction to be pressed against the distal end collar of the slide shaft; and said slide ring biased by said first bias spring in a direction to be pressed against the hook, wherein when the valve element is positioned in a range for discharging medium-temperature water mixture, said flange-like stopper and the stopper ring are spaced apart from each other, said stopper ring is pressed against the distal end collar of the slide shaft by the second bias spring, said collar-like stopper and the slide ring are spaced apart from each other, and said slide ring is pressed against the hook by the first bias spring, and when the valve element is positioned in a range for discharging low-temperature water mixture, said flange-like stopper is engaged with said stopper ring and said hook is engaged with the proximal end collar so as to restrict the movement of the hook in a direction toward the valve body, whereby the biasing force of the second bias spring is applied to the valve element via the stopper ring and the main shaft in the same direction of the biasing force of said temperature-sensitive spring, and said collar-like stopper is engaged with the slide ring so that the biasing force of the first bias spring does not act on the valve element and the slide shaft.

In another embodiment (fifth aspect) of the hot and cold water mixing device, according to the second aspect, the temperature setting member comprises: a rotational shaft arranged coaxially with said main shaft and having internal thread formed in the inner surface thereof; a cylindrical slide shaft arranged coaxially with said rotational shaft and having external thread to be engaged with said internal thread; and a clutch column arranged movably in the axial direction of said valve body, a first bias spring is disposed between said clutch column and the valve element in the compressed state, and a second bias spring is disposed between the clutch column and the slide shaft in the compressed state.

In this case, it is preferable that the clutch column is engaged with the slide shaft so as to restrict the movement of the clutch column in the axial direction, or that the clutch column is engaged with the valve element so as to restrict the movement of the clutch column in the axial direction.

According to the sixth aspect of the present invention, a plurality of bias springs is provided as said bias spring, and said biasing force changing means controls such that when the valve element is positioned in a range for discharging medium-temperature water mixture, the serially combined biasing force of the respective bias springs is applied to the valve element in a direction opposite to that of the biasing force of the temperature-sensitive spring, and when the valve element is positioned in a range for discharging low-temperature water mixture, the biasing force of a part of the bias springs is applied to the valve element in the same direction of the biasing force of the temperature-sensitive spring.

In this hot and cold water mixing device, when the target temperature of water mixture is set in the medium-temperature range, all of the bias springs serially act on the valve element in the direction opposite to that of the biasing force of the temperature-sensitive spring. Since the biasing force of the serially combined bias springs should be smaller, the slope indicating the travel of the valve element (i.e. the temperature of water mixture) relative to the turning angle of the temperature regulating handle is gentle.

When the target temperature of water mixture is set in the low-temperature range, a part of the bias springs biases the valve element in the same direction of the biasing force of the temperature-sensitive spring. In this case, the slope indicating the travel of the valve element (i.e. the temperature of water) relative to the turning angle of the temperature regulating handle is steep.

In the seventh aspect of the hot and cold water mixing device, according to the sixth aspect, said temperature setting member comprises: a rotational shaft arranged rotatably about its axis and having internal thread formed in the inner surface thereof; a cylindrical slide shaft arranged coaxially with said rotational shaft and having external thread to be engaged with said internal thread; a clutch column arranged movably in the axial direction of said slide shaft; a first bias spring disposed between said clutch column and the valve element in the compressed state, and a second bias spring disposed between clutch column and the slide shaft in the compressed state.

In the eighth aspect, an engaging member for engaging the slide shaft and the clutch column when the temperature is set at a low temperature by said temperature setting member is also provided, and this biasing force changing means comprises: a projecting shaft extending from said valve element toward the slide shaft; a stopper disposed on the end of said projecting shaft; and a washer biased by said second bias spring in a direction to be pressed against the slide shaft, wherein when the valve element is positioned in a range for discharging high-temperature water mixture or a range for discharging medium-temperature water mixture, said stopper and the washer are spaced apart from each other and said washer is pressed against the slide shaft by the second bias spring, and when the valve element is positioned in a range for discharging low-temperature water mixture, said stopper is engaged with said washer and said engaging member restricts the movement of the clutch column in a direction toward the valve body, whereby the biasing force of the second bias spring is applied to the valve element via the washer and the projecting shaft in the same direction of the biasing force of said temperature-sensitive spring. In this case, as stated in the ninth aspect, it is preferable that when the valve element is positioned in a range for discharging high-temperature water mixture, the clutch column comes in contact with the valve element or the slide shaft so as to restrict the movement of the clutch column in the axial direction.

In addition, in the tenth aspect, this changing means may comprise: a projecting shaft extending from said valve element toward the slide shaft; a first stopper disposed on the end of said projecting shaft; a second stopper disposed on a middle portion of said projecting shaft; a first washer biased by said second bias spring in a direction to be pressed against the slide shaft; and a second washer biased by said first bias spring in a direction to be pressed against the clutch column, wherein when the valve element is positioned in a range for discharging medium-temperature water mixture, said first stopper and the first washer are spaced apart from each other and said first washer is pressed against the slide shaft by the second bias spring while the second stopper and the second washer are spaced apart form each other and the said second washer is pressed against the clutch column by the first bias spring, and when the valve element is positioned in a range for discharging low-temperature water mixture, said first stopper is engaged with said first washer and said engaging member restricts the movement of the clutch column in a direction toward the valve body, whereby the biasing force of the second bias spring is applied to the valve element via the first washer and the projecting shaft in the same direction of the biasing force of said temperature-sensitive spring, while said second stopper is engaged with said second washer whereby the biasing force of the first bias spring does not act on the valve element and the slide shaft.

Further, in the eleventh aspect, this changing means may comprise: a projecting shaft extending from said slide shaft toward said valve element; a stopper disposed on the end of said projecting shaft; and a washer biased by said first bias spring in a direction to be pressed against the valve element, wherein when the valve element is positioned in a range for discharging high-temperature water mixture or a range for discharging medium-temperature water mixture, said stopper and the washer are spaced apart from each other and said washer is pressed against the valve element by the first bias spring, and when the valve element is positioned in a range for discharging low-temperature water mixture, said stopper is engaged with said washer and said engaging member restricts the movement of the clutch column in a direction apart from the valve body, whereby the biasing force of the first bias spring is applied to the valve element via the washer, the projecting shaft, and the clutch column in the same direction of the biasing force of said temperature-sensitive spring. In this case, as stated in twelfth aspect, it is preferable that when the valve element is positioned in a range for discharging high-temperature water mixture, the clutch column comes in contact with the valve element or the slide shaft so as to restrict the movement of the clutch column in the axial direction.

In the thirteenth aspect, this changing means may comprise: a projecting shaft extending from said slide shaft toward said valve element; a first stopper disposed on the end of said projecting shaft; a second stopper disposed on a middle portion of said projecting shaft; a first washer biased by said first bias spring in a direction to be pressed against the valve element; and a second washer biased by said second bias spring in a direction to be pressed against the clutch column, wherein when the valve element is positioned in a range for discharging medium-temperature water mixture, said first stopper and the first washer are spaced apart from each other and said first washer is pressed against the valve element by the first bias spring, while said second stopper and the second washer are spaced apart from each other and said second washer is pressed against the clutch column by the second bias spring., and when the valve element is positioned in a range for discharging low-temperature water mixture, said first stopper is engaged with said first washer and said engaging member restricts the movement of the clutch column in a direction apart from the valve body, whereby the biasing force of the first bias spring is applied to the valve element via the first washer, the projecting shaft, and the clutch column in the same direction of the biasing force of said temperature-sensitive spring, while said second stopper is engaged with said second washer whereby the biasing force of the second bias spring does not act on the valve element and the slide shaft.

In a hot and cold water mixing device according to the fourteenth aspect of the present invention, a plurality of bias springs is provided as said bias spring, and said biasing force changing means for changing the biasing force of the bias springs acting on said valve element controls such that when the valve element is positioned in a range for discharging high-temperature water mixture, the concurrent (total) biasing force of all of the bias springs is applied to the valve element in a direction opposite to that of the biasing force of the temperature-sensitive spring; when the valve element is positioned in a range for discharging medium-temperature water mixture, the biasing force of a part of the bias springs is applied to the valve element in a direction opposite to that of the biasing force of the temperature-sensitive spring; and when the valve element is positioned in a range for discharging low-temperature water mixture, the valve element is moved directly by said temperature setting member.

In this hot and cold water mixing device, when the target temperature of water mixture is set in the high-temperature range, the concurrent biasing force of the plural bias springs acts on the valve element in the direction opposite to that of the biasing force of the temperature-sensitive spring so that the slope indicating the travel of the valve element (i.e. the temperature of water mixture) relative to the turning angle of the temperature regulating handle is steep.

When the target temperature of water mixture is set in the medium-temperature range, only a part of the bias springs acts on the valve element in the direction opposite to that of the biasing force of the temperature-sensitive spring so that the slope indicating the travel of the valve element (i.e. the temperature of water mixture) relative to the turning angle of the temperature regulating handle is gentle.

When the target temperature of water mixture is set in the low-temperature range, the valve element moves integrally with the temperature setting member, e.g. the slide shaft, so that the slope indicating the travel of the valve element (i.e. the temperature of water) relative to the turning angle of the temperature regulating handle is steep.

In the hot and cold water mixing device of the fourteenth aspect, in the fifteenth aspect, said valve element is supported by a main shaft arranged coaxially with said valve body, said main shaft being slidable in the axial direction of said valve body; wherein said temperature setting member comprises: a rotational shaft arranged rotatably about its axis and having internal thread formed in the inner surface thereof; and a cylindrical slide shaft arranged coaxially with said rotational shaft and having external thread to be engaged with said internal thread, wherein said changing means comprises: a projecting shaft extending from said main shaft toward said slide shaft; a stopper disposed on the end of said projecting shaft; and a washer capable of coming in contact with said stopper, and wherein a first bias spring is disposed between said washer and the valve element and a second bias spring is disposed between said slide shaft and the valve element. When the valve element is positioned in a range for discharging high-temperature water mixture, said stopper and the washer are spaced apart from each other and the washer and the slide shaft are engaged with each other whereby the first bias spring is subjected to the reaction force by the slide shaft and thus biases the valve element, when the valve element is positioned in a range for discharging medium-temperature water mixture, the stopper is engaged with the washer wherein the application of the biasing force of the first bias spring to the valve element is cancelled, and when the valve element is positioned in a range for discharging low-temperature water mixture, the valve element and the slide shaft are engaged with each other so that the valve element and the slide shaft move integrally with each other.

In a hot and cold water mixing device according to the sixteenth aspect of the present invention, a plurality of bias springs is provided as said bias spring, and said biasing force changing means for changing the biasing force of the bias springs acting on said valve element controls such that when the valve element is positioned in a range for discharging high-temperature water mixture, the concurrent (total) biasing force of all of the bias springs is applied to the valve element in a direction opposite to that of the biasing force of the temperature-sensitive spring; when the valve element is positioned in a range for discharging medium-temperature water mixture, the biasing force of a part of the bias springs is applied to the valve element in a direction opposite to that of the biasing force of the temperature-sensitive spring; and when the valve element is positioned in a range for discharging low-temperature water mixture, the biasing force of the other bias spring (springs) is applied to the valve element in the same direction of the biasing force of the temperature-sensitive spring.

In this hot and cold water mixing device, when the target temperature of water mixture is set in the high-temperature range, the concurrent biasing force of the plural bias springs acts on the valve element in the direction opposite to that of the biasing force of the temperature-sensitive spring so that the slope indicating the travel of the valve element (i.e. the temperature of water mixture) relative to the turning angle of the temperature regulating handle is steep.

When the target temperature of water mixture is set in the medium-temperature range, only a part of the bias springs acts on the valve element in the direction opposite to that of the biasing force of the temperature-sensitive spring so that the slope indicating the travel of the valve element (i.e. the temperature of water mixture) relative to the turning angle of the temperature regulating handle is more gentle than that in case of the high-temperature range.

When the target temperature of water mixture is set in the low-temperature range, the other bias springs bias the valve element in the same direction of the biasing force of the temperature-sensitive spring. In this case also, the slope indicating the travel of the valve element (i.e. the temperature of water) relative to the turning angle of the temperature regulating handle is steep.

In the hot and cold water mixing device of the sixteenth aspect, in the seventeenth aspect, said temperature setting member preferably comprises: a rotational shaft arranged rotatably about its axis and having internal thread formed in the inner surface thereof; and a cylindrical slide shaft arranged coaxially with said rotational shaft and having external thread to be engaged with said internal thread, and further comprising: a second bias spring being disposed between the slide shaft and the valve element; first and second collars disposed on said column and spaced apart from each other in the axial direction; a first washer and a second washer disposed to face said first collar and said second collar, respectively; a first bias spring disposed between said first washer and said second washer in the compressed state; a collar disposed on said slide shaft which is engaged with said first washer to press said first washer in the direction apart from the valve element when the slide shaft is moved in a direction apart from the valve element; and a step disposed on said slide shaft which is engaged with said second washer to press said second washer in the direction toward the valve element when the slide shaft is moved in a direction toward the valve element.

A control mechanism of a hot and cold water mixing device according to the eighteenth aspect comprises: a main body having a hot water port and a cold water port formed in the circumferential surface thereof; a valve element disposed in an inner chamber of the main body; a temperature-sensitive spring and a bias spring for biasing the valve element; and a regulating member for controlling the position of the valve element by changing the biasing force of the bias spring, wherein the valve element is brought in contact directly or indirectly with one end of the bias spring and the regulating member is brought in contact directly or indirectly with the other end of the bias spring and the regulating member is controlled so as to change the flowing rates of hot water and cold water to obtain water mixture at a desired temperature, wherein the valve element is provided with a contact surface which can come in contact directly or indirectly with a regulating member contact surface of the bias spring, and the regulating member is provided with a contact surface which can come in contact directly or indirectly with a valve element contact surface of the bias spring, whereby the bias spring biases the valve element in a direction of closing the hot water port at least when the hot water port is closed.

When the temperature of water mixture to be discharged is set in the low-temperature range, the spring constant of the temperature-sensitive spring may be too low to sufficiently cope with the supply pressure of hot water. However, in the hot and cold water mixing device according to the present invention, the valve element is directly or indirectly linked with the regulating member for varying the biasing force of the bias spring when the target temperature is set in such a range whereby the bias spring functions as a buffer for softening the operation force applied to the valve element after the valve element is seated and, in addition, the axial position of the valve element can be controlled via the regulating member. Further, the bias spring acts to bias the valve element in the closing direction.

BRIEF DESCRIPTION OF THE DRAWINGS

FIGS. 5a and 5b are views for explaining a temperature regulating handle of the hot and cold water mixing device;

FIG. 6 is a sectional view showing a hot and cold water mixing device according to a second preferred embodiment;

FIG. 18A is a side view showing a sliding connecting member of the hot and cold water mixing device according to the tenth preferred embodiment and FIG. 18B is a rear view thereof;

FIG. 19 is a sectional plan view of a hot and cold water mixing device according to an eleventh preferred embodiment.

DESCRIPTION OF THE PREFERRED EMBODIMENTS

[First Preferred Embodiment]

Figure 1:
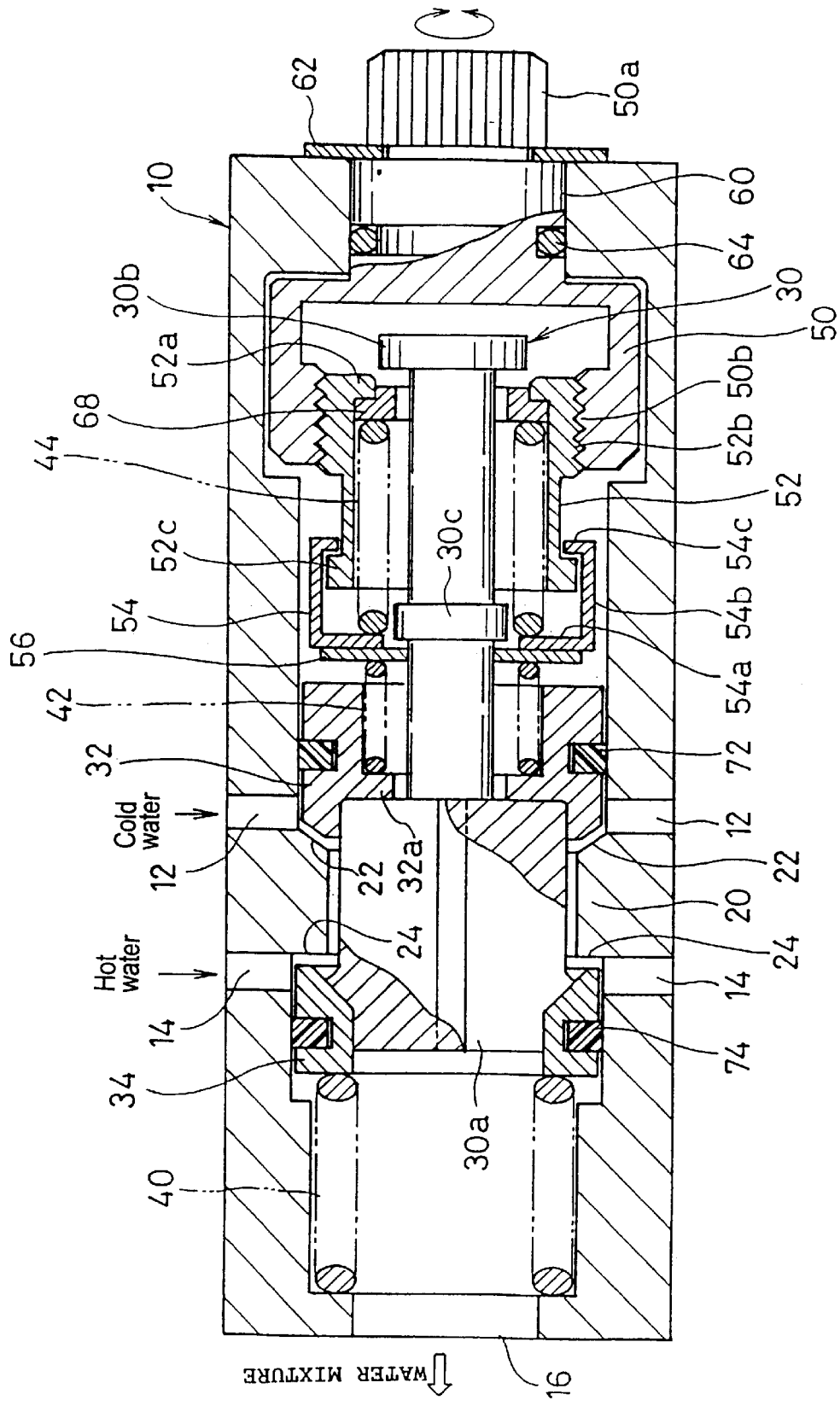
FIG. 1 is a sectional view showing a hot and cold water mixing device according to a first preferred embodiment.
Figure 2:
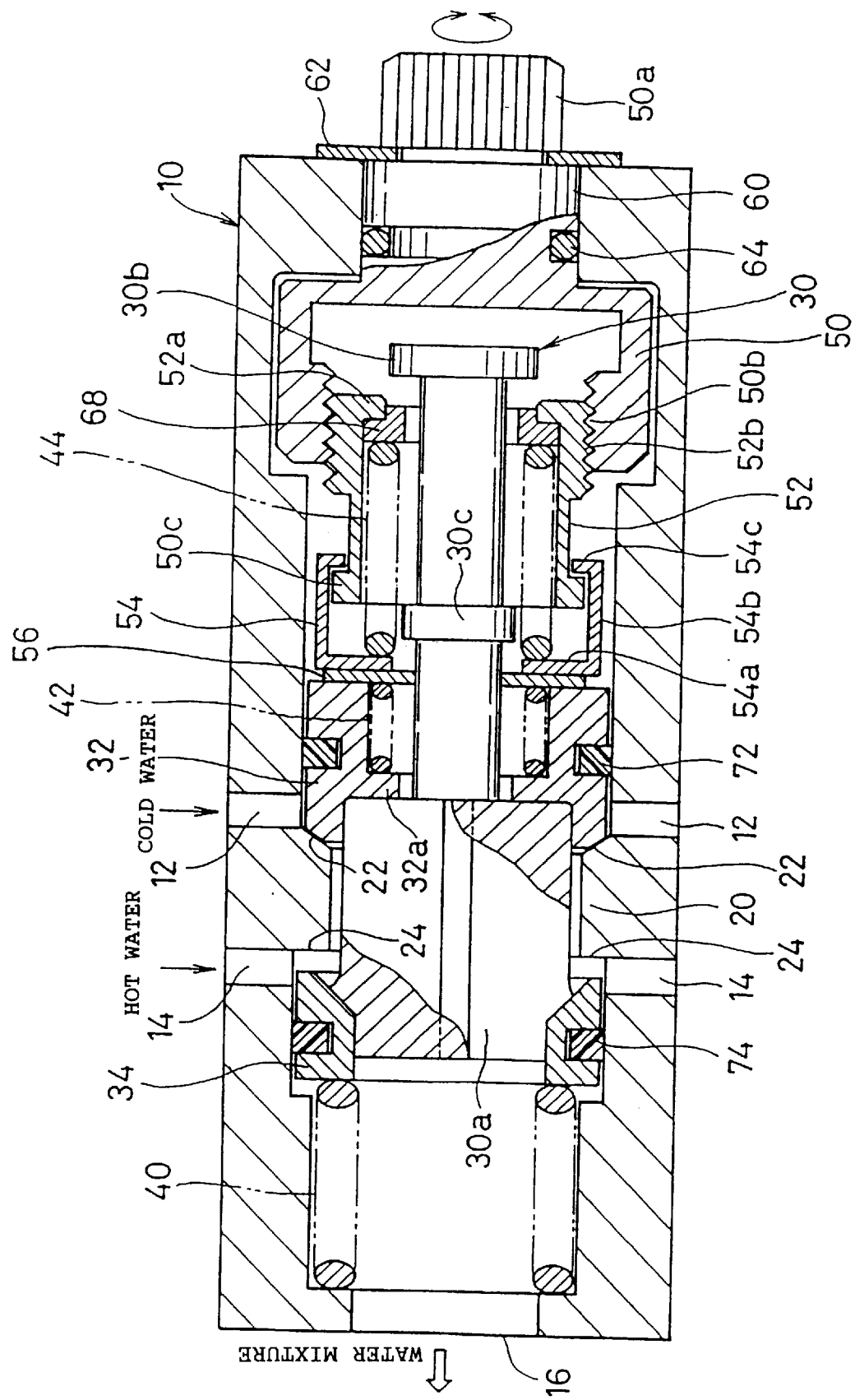
FIG. 2 is a sectional view showing the hot and cold water mixing device shown in FIG. 1 in a state that high-temperature water is discharged.
Figure 3:
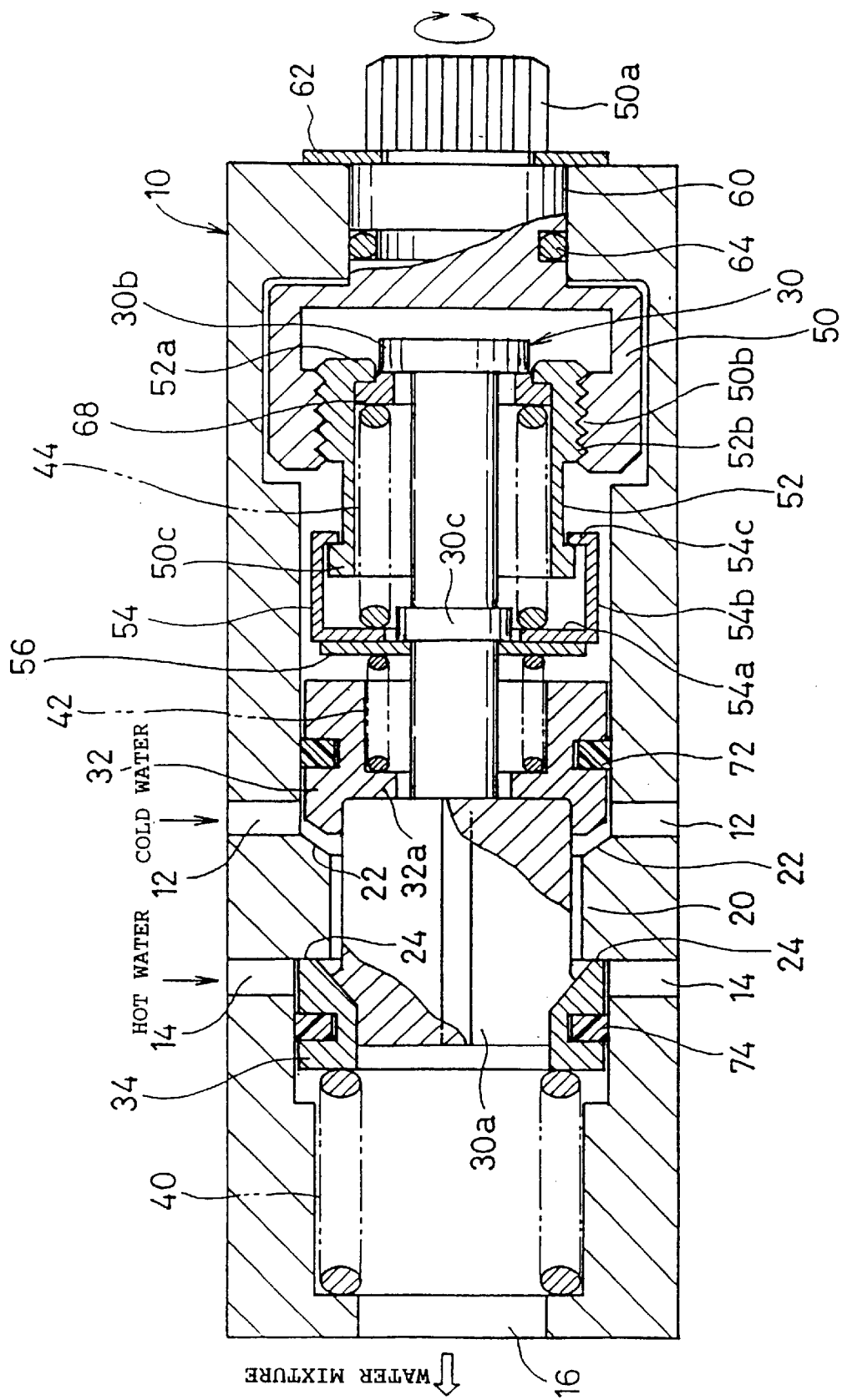
FIG. 3 is a sectional view showing the hot and cold water mixing device shown in FIG. 1 in a state that low-temperature water is discharged.

FIG. 1 is a sectional view showing a hot and cold water mixing device according to the first preferred embodiment, FIG. 2 is a sectional view showing the hot and cold water mixing device shown in a state that high-temperature water is discharged, and FIG. 3 is a sectional view showing the hot and cold water mixing device in a state that low-temperature water is discharged. It should be noted that "left" and "right" in the following description correspond to "left" and "right" in FIGS. 1 through 3, respectively.

A cylindrical valve body 10 has a cold water port 12 and a hot water port 14 formed in a circumferential wall thereof and has a discharge port 16 for water mixture at the left end thereof. The hot water port 14 is positioned more left than the cold water port 12. In the valve body 10, a convexity 20 is formed by inwardly swelling a portion of the inner surface of the body between the water ports 12 and 14. The right end surface of the convexity 20 functions as a cold water valve seat 22 and the left end surface functions as a hot water valve seat 24.

A ling-like cold water valve element 32 is disposed to face the cold water valve seat 22 and a ring-like hot water valve element 34 is disposed to face the hot water valve seat 24 in such a manner that the valve elements 32 and 34 are fitted to a cruciform portion 30a of a main shaft 30. The cross section of the cruciform portion 30a perpendicular to the axis of the main shaft 30 is formed in a cruciform shape.

The main shaft 30 is arranged in such a manner as to be pressed rightwards by the temperature-sensitive spring 40 made of shape memory alloy and to be pressed leftwards by a first bias spring 42 and a second bias spring 44. As a mechanism for moving the bias springs 42, 44 along the axial direction of the main shaft, a rotational shaft 50, a slide shaft 52, a hook 54, and a slide ring 56 are arranged surrounding the main shaft 30.

A handle-mounting portion 50a at the right end of the rotational shaft 50 is disposed to project rightwards from a shaft-through hole 60 of the valve body 10. A handle (not shown) is attached to this handle-mounting portion 50a. An E-ring 62 is fitted on a neck of the handle-mounting portion 50a, thereby preventing the movement of the rotational shaft 50 in the axial direction. Numeral 64 designates an O-ring.

The left-end side of the rotational shaft 50 is formed in a cylindrical shape and is formed with an internal thread 50b. The right-end side of the cylindrical slide shaft 52 is formed with an external thread 52b which engages with the internal thread 50b whereby the rotation of the rotational shaft 50 moves the slide shaft 52 in the axial direction.

The slide shaft 52 is formed with a collar (distal collar) 52a projecting inwardly at the right end of the slide shaft 52. A stopper ring 68 is engaged with the collar 52a. The stopper ring 68 is slidable in the axial direction along the inner surface of the slide shaft 52. An end of the second bias spring 44 is in contact with the stopper ring 68.

The slide shaft 52 is formed with a collar (proximal collar) 52c projecting outwardly at the left end of the slide shaft 52. Pawls 54c at the right end of the hook 54 are engageable with the collar 52c. The hook 54 comprises a disk portion 54a on the left side thereof which is arranged perpendicular to the axis of the main shaft 30 and a plurality of leg portions 54b extending from the outer periphery of the disk portion 54a in a rightward direction parallel to the axis of the main shaft 30. The pawls 54c are formed by folding inwardly the ends of the leg portions 54b. The left end of the second bias spring 44 is in contact with the disk portion 54a.

The slide ring 56 is superposed on the disk portion 54a. The right end of the first bias spring 42 is in contact with the slide ring 56. The left end of the first bias spring 42 is in contact with a collar 32a convexly formed on an inner surface of the cold water valve element 32.

The left-end portion of the cold water valve element 32 is slidably fitted onto the cruciform portion 30a of the main shaft 30. The light-end portion of the hot water valve element 34 is slidably fitted onto the cruciform portion 30a.

Respectively fitted onto the cold water valve element 32 and the hot water valve element 34 are seal rings 72, 74 made of fluororesin having high sliding property. These seal rings 72, 74 water-sealingly and slidably abut on the inner surface of the valve body 10.

The main shaft 30 has a flange 30b (a flange-like stopper) formed on the right end thereof which is sized to enter into the collar 52a and to be caught by the stopper ring 68. The main shaft 30 also has a collar 30c (a collar-like stopper) formed on a middle portion thereof which is sized to be caught by the slide ring 56.

The operation of the hot and cold water mixing device structured as mentioned above will be described hereinafter.

I. When the Target Temperature of Water Mixture is Set in the Medium-temperature Range From 30° C. to 50° C. (see FIG. 1)

When the target temperature of water mixture is set at a temperature, for example, in the medium-temperature range from 30° C. to 50° C. as shown in FIG. 1, the combined biasing force of the serially-arranged bias springs 42, 44

(hereinafter, sometimes referred to as "serial biasing force of the bias springs 42, 44") is exerted leftwards to the main shaft 30 via the cold water valve element 32, while a biasing force of the temperature-sensitive spring 40 is exerted rightwards to the main shaft 30. The combined biasing force and the biasing force balance with each other and the main shaft 30 and the valve elements 32, 34 are thus stopped.

In this state, when the actual temperature of water mixture becomes lower than the preset target temperature due to a variation in the supply temperature or the supply pressure of hot water, the temperature-sensitive spring 40 contracts so that the main shaft 30 is moved leftwards and a flow space for cold water between the cold water valve seat 22 and the cold water valve element 32 is reduced while a flow space for hot water between the hot water valve seat 24 and the hot water valve element 34 is increased, thereby returning (rising) the actual temperature of water mixture to the preset target temperature. To the contrary, when the actual temperature of water mixture becomes higher than the preset target temperature, the temperature-sensitive spring 40 expands so that the cold water valve element 32 and the hot water valve element 34 are moved rightwards together with the main shaft 30 so as to increase the flow space for cold water and reduce the flow space for hot water, thereby returning (lowering) the actual temperature of water mixture to the preset target temperature.

When the handle is turned in the positive direction to increase the target temperature of water mixture to another temperature within the medium-temperature range, the slide shaft 52 is moved leftwards according to the rotation of the rotational shaft 50 in the positive direction so that the stopper ring 68 is also moved leftwards. As a result of this, the combined biasing force of the bias springs 42, 44 in the leftward direction is increased. Therefore, the bias springs 42, 44 shift the valve elements 32, 34 leftwards together with the main shaft 30 so as to increase the flow space for hot water and reduce the flow space for cold water, thereby increasing the temperature of water mixture. After the valve elements 32, 34 are shifted, the rightward biasing force of the temperature-sensitive spring 40 and the leftward biasing force of the bias springs 42, 44 balance with each other. When the actual temperature of water mixture deviates from the preset target temperature, the temperature-sensitive spring 40 expands or contracts, thereby returning the actual temperature of water mixture to the preset target temperature.

When the handle is turned in the opposite direction to decrease the target temperature of water mixture to another temperature within the medium-temperature range, the slide shaft 52 is moved rightwards according to the rotation of the rotational shaft 50 in the opposite direction so that the stopper ring 68 is also moved rightwards. As a result of this, the leftward biasing force of the bias springs 42, 44 is decreased so that the valve elements 32, 34 are shifted rightwards together with the main shaft 30 so as to reduce the flow space for hot water and increase the flow space for cold water, thereby lowering the temperature of water mixture. After the valve elements 32, 34 are shifted, the rightward biasing force of the temperature-sensitive spring 40 and the leftward biasing force of the bias springs 42, 44 balance with each other. When the actual temperature of water mixture deviates from the preset target temperature, the temperature-sensitive spring 40 expands or contracts, thereby returning the actual temperature of water mixture to the preset target temperature.

As mentioned above, when the target temperature of water mixture is set to any temperature in the medium-temperature range from 30° C. to 50° C., both of the bias springs 42, 44 work. Assuming that the spring constants of the bias springs 42, 44 are $k_1$, $k_2$, respectively, the force pressing the main shaft 30 leftwards is the serial biasing force of the bias springs 42, 44 so that the spring constant of the serially combined bias springs is explained by $1/(1/k_1+1/k_2)$ which is smaller than either of $k_1$, $k_2$.

Accordingly, when the preset target temperature is in the medium-temperature range, a ratio (a/A) between the travel (A) of the rotational shaft 50 and the slide shaft 52 and the travel (a) of the valve elements 32, 34 is relatively small. That is to say, the travel (a) of the valve elements 32, 34 per a unit angle of the rotational shaft 50 is relatively small. As a result, as shown by solid line in FIG. 4, the amount in change of the target temperature per the unit angle of the handle is small when the target temperature of water mixture is set in the medium-temperature range, that is, in the graph of FIG. 4, the slope of a temperature line in the medium-temperature range is gentle.

II. When the Target Temperature of Water Mixture is Set in the High-temperature Range Exceeding 50° C. (see FIG. 2)

When the target temperature of water mixture is set at a temperature exceeding 50° C., the slide shaft 52 is moved leftwards largely and the second bias spring 44 presses the slide ring 56 so that the slide ring 56 comes in contact with the right end of the cold water valve element 32. Therefore, when the handle is turned to enter into the high temperature range exceeding 50° C., the slide shaft 52 biases the main shaft 30 via only the second bias spring 44 as shown in FIG. 2. The spring constant of the second bias spring 44 is $k_2$ which is larger than the spring constant $1/(1/k_1+1/k_2)$ in case of the medium-temperature range. Accordingly, the ratio (a/A) between the travel (A) of the slide shaft 52 and the travel (a) of the valve elements 32, 34 is larger than that in case of the medium-temperature range. That is to say, the amount in change of the target temperature per the unit angle of the handle is larger than that in case of-the medium-temperature range. Therefore, in the graph of FIG. 4, the slope of the temperature line in the high-temperature range is steeper than that in the medium-temperature range. This means that the temperature of water mixture is significantly changed only by slightly turning the handle in the high-temperature range exceeding 50° C.

III. When the Target Temperature of Water Mixture is Set in the Low-temperature Range Below 30° C. (see FIG. 3)

When the target temperature of water mixture is set at a temperature below 30° C., the slide shaft 52 is moved rightwards largely and the collar 52c of the slide shaft 52 and the pawls 54c of the hook 54 are engaged with each other so that the hook 54 is moved rightwards together with the slide shaft 52. Then, the slide ring 56 comes in contact with the collar 30c so that the first bias spring 42 expands between the cold water valve element 32 and the slide ring 56 (the collar 30c). In this state, the biasing force of the first bias spring 42 does not act on the main shaft 30.

Also in this case, as the target temperature is set significantly low (for example, the handle is turned to a position near "C"), the slide shaft 52 is further moved rightwards so that the flange 30b on the right end of the main shaft 30 comes in contact with the stopper ring 68. In this state, the second bias spring 44 presses the main shaft 30 rightwards via the stopper ling 68 and the flange 30b so that the hot water valve element 34 is pressed against the hot water valve seat 24 by the rightward biasing force of the temperature-sensitive spring 40.

Therefore, when the handle is turned to enter into the low-temperature range below 30° C., the leftward biasing force of the bias springs 42, 44 does not act so that the hot water valve element 34 moves closer to the hot water valve seat 24 by the rightward biasing force of the temperature-sensitive spring 40. In addition when the target temperature is set to significantly low temperature, the biasing force of the second bias spring 44 acts on the main shaft 30 in the rightward direction whereby the hot water valve element 34 is pressed against the hot water valve seat 24 by the temperature-sensitive spring 40. Accordingly, the ratio (a/A) between the travel (A) of the rotational shaft 50 and the slide shaft 52 and the travel (a) of the valve elements 32, 34 is larger than that in case of the medium-temperature range. That is, the amount in change of the target temperature per the unit angle of the handle is larger than that in case of the medium-temperature range. Therefore, in the graph of FIG. 4, the slope of the temperature line in the low-temperature range is steeper than that in the medium-temperature range. That is to say, the temperature of water mixture is significantly changed only by slightly turning the handle in the low-temperature range below 30° C.

It should be noted that while the handle is turned into the low-temperature range below 30° C., the stopper ring 68 may come in contact with the flange 30b before the slide ring 56 comes in contact with the collar 30c.

[Second Preferred Embodiment]

The second preferred embodiment will be described with reference to FIG. 6. In this preferred embodiment, only one valve element 33 is adapted to regulate both a flow space for cold water and a flow space for hot water. In this preferred embodiment, contrary to the embodiment of FIGS. 1 through 3, a cold water port 12 is positioned more left than a hot water port 14 so that a cold water valve seat 22 is also positioned more left than a hot water valve seat 24.

The valve element 33 comprises a central shaft portion 33C arranged at the axis of a cylindrical valve body 10A, flanges 33A, 33B disposed on the left end and the right end of the central shaft portion 33C, a center flange 33D, a cylindrical portion 33E connected to a middle portion in the longitudinal direction of the central shaft portion 33C via the center flange 33D, a seal ring 73 which is disposed on the outer periphery of the cylindrical portion 33E and water-sealingly and slidably abuts on the inner surface of the body 10A, and through holes 33a, 33b, 33d formed in the flanges 33A, 33B, 33D, respectively.

The right end of a temperature-sensitive spring 40 is in contact with the flange 33A. The left end of a first bias spring 42 is in contact with the flange 33B. Arranged between the valve element 33 and a slide shaft 52 is a clutch column 80.

The clutch column 80 can reciprocate in the axial direction along the inner surface of the body 10A. The clutch column 80 has a collar 80a convexly formed on an inner surface of the clutch column 80. A first bias spring 42 is disposed between the collar 80a and the flange 33B of the valve element 33 in the compressed state.

A second bias spring 44 is disposed between the collar 80a and a collar 52a of the slide shaft 52 in the compressed state. The clutch column 80 has a collar 80b convexly formed on an inner surface of the right-end portion of the clutch column 80. The collar 80b is engageable with a collar 52c formed on the left-end outer surface of the slide shaft 52.

Other structures of the hot and cold water mixing device of FIG. 6 are the same as those of the hot and cold water mixing device of FIGS. 1 through 3 and parts similar or corresponding to the parts of the hot and cold water mixing device of FIGS. 1 through 3 are marked by the same reference numerals.

The operation of the hot and cold water mixing device structured as mentioned above with reference to FIG. 6 will be described hereinafter.

I. When the Target Temperature of Water Mixture is Set in the Medium-temperature Range From 30° C. to 50° C.

FIG. 6 shows the hot and cold water mixing device in a state that the target temperature of water mixture is set at a temperature, for example, in the medium-temperature range from 30° C. to 50° C. In this state, the combined biasing force of serially-arranged the bias springs 42, 44 is exerted leftwards to the valve element 33, while a biasing force of the temperature-sensitive spring 40 is exerted rightwards to the valve element 33. The combined biasing force and the biasing force balance with each other.

In this state, when the actual temperature of water mixture becomes lower than the preset target temperature due to a variation in the supply temperature or the supply pressure of hot water, the temperature-sensitive spring 40 contracts so that the valve element 33 is moved leftwards and a flow space for cold water between the cold water valve seat 22 and the valve element 33 is reduced while a flow space for hot water between the hot water valve seat 24 and the valve element 33 is increased, thereby returning (rising) the actual temperature of water mixture to the preset target temperature. To the contrary, when the actual temperature of water mixture becomes higher than the preset target temperature, the temperature-sensitive spring 40 expands so that the valve element 33 is moved rightwards so as to increase the flow space for cold water and reduce the flow space for hot water, thereby returning (lowering) the actual temperature of water mixture to the preset target temperature.

When the handle is turned in the positive direction to increase the target temperature of water mixture to another temperature within the medium-temperature range, the slide shaft 52 is moved leftwards according to the rotation of the rotational shaft 50 in the positive direction so that the clutch column 80 is also moved leftwards. As a result of this, the combined biasing force of the bias springs 42, 44 in the leftwards direction is increased. Therefore, the bias springs 42, 44 shift the valve element 33 leftwards so as to increase the flow space for hot water and reduce the flow space for cold water, thereby increasing the temperature of water mixture. After the valve element 33 is shifted, the rightward biasing force of the temperature-sensitive spring 40 and the leftward biasing force of the bias springs 42, 44 balance with each other. When the actual temperature of water mixture deviates from the preset target temperature, the temperature-sensitive spring 40 expands or contracts, thereby returning the actual temperature of water mixture to the preset target temperature.

When the handle is turned in the opposite direction to decrease the target temperature of water mixture to another temperature within the medium-temperature range, the slide shaft 52 is moved lightwards according to the rotation of the rotational shaft 50 in the opposite direction so that the clutch column 80 is also moved rightwards. As a result of this, the leftward biasing force of the bias springs 42, 44 is decreased so that the valve element 33 is shifted rightwards so as to reduce the flow space for hot water and increase the flow space for cold water, thereby lowering the temperature of water mixture. After the valve element 33 is shifted, the rightward biasing force of the temperature-sensitive spring 40 and the leftward biasing force of the bias springs 42, 44 balance with each other. When the actual temperature of water mixture deviates from the preset target temperature, the temperature-sensitive spring 40 expands or contracts, thereby returning the actual temperature of water mixture to the preset target temperature.

As mentioned above, when the target temperature of water mixture is set to any temperature in the medium-temperature range from 30° C. to 50° C., both of the serially-arranged bias springs 42, 44 with the spring constant $1/(1/k_1+1/k_2)$ work to press the valve element 33. Therefore, just like the hot and cold water mixing device of FIGS. 1 through 3, in the graph of FIG. 4, the slope of the temperature line in the medium-temperature range is gentle.

II. When the Target Temperature of Water Mixture is Set in the High-temperature Range Exceeding 50° C.

When the target temperature of water mixture is set at a temperature exceeding 50° C., the slide shaft 52 is moved leftwards largely. Accordingly, (1) the left end of the clutch column 80 comes in directly contact with the flange 33B;

(2) the left end of the slide shaft 52 comes in contact with the collar 80a of the clutch column 80; or (3) a step 52s at the left end of an external thread 52b of the slide shaft 52 comes in contact with the right end of the clutch column 80.

Therefore, when the handle is turned to enter into the high temperature range exceeding 50° C., the valve element 33 is moved by balance between the rightward biasing force of the temperature-sensitive spring 40 and the leftward biasing force of either one of the bias springs 42, 44. The spring constant of the bias spring 42 or 44 is $k_1$ or $k_2$ which is larger than the spring constant $1/(1/k_1+1/k_2)$ of the combined bias springs applied in case of the medium-temperature range. Accordingly, the ratio (a/A) between the travel (A) of the slide shaft 52 and the travel (a) of the valve element 33 is larger than that in case of the medium-temperature range. Thus, the amount in change of the target temperature per the unit angle of the handle is larger than that in case of the medium-temperature range. Therefore, in the graph of FIG. 4, the slope of the temperature line in the high-temperature range is steeper than that in the medium-temperature range.

III. When the Target Temperature of Water Mixture is Set in the Low-temperature Range Below 30° C.

When the target temperature of water mixture is set at a temperature below 30° C., the slide shaft 52 is moved rightwards largely and the collar 52c of the slide shaft 52 and the collar 80b of the clutch column 80 are engaged with each other so that the biasing force of the second bias spring 44 does not act on the valve element 33. In this case, the slide shaft 52 and the clutch column 80 are joined just like one rigid member. Therefore, when the handle is turned to enter into the low-temperature range below 30° C., the clutch column 80 are moved integrally with the slide shaft 52.

Accordingly, the ratio (a/A) between the travel (A) of the rotational shaft 50 and the slide shaft 52 and the travel (a) of the valve element 33 is larger than that in case of the medium-temperature range. That is to say, the amount in change of the target temperature per the unit angle of the handle is larger than that in case of the medium-temperature range. Therefore, in the graph of FIG. 4, the slope of the temperature line in the low-temperature range is steeper than that in the medium-temperature range.

[Third Preferred Embodiment]

The third preferred embodiment (particularly claims 8 through 11) will be described with reference to FIG. 7.

In this preferred embodiment, a valve element 133 further comprises a pair of flanges 331, 332 on the outer periphery of a flange 33B of the valve element 133. The flanges 331, 332 are arranged to be spaced apart from each other in the axial direction of the valve element 133. Other structures of the valve element 133 are the same as those of the aforementioned valve element 33 of FIG. 6.

A clutch column 80A has a collar 80c convexly formed on an inner surface of a left-end portion of the clutch column 80A. The collar 80c is positioned between the flanges 331 and 332. The clutch column 80A is different from the clutch column 80 of FIG. 6 at a point that the collar 80b is not provided. A slide shaft 52 is different from the slide shaft 52 of FIG. 6 at a point that the collar 52c is not provided.

Figure 7:
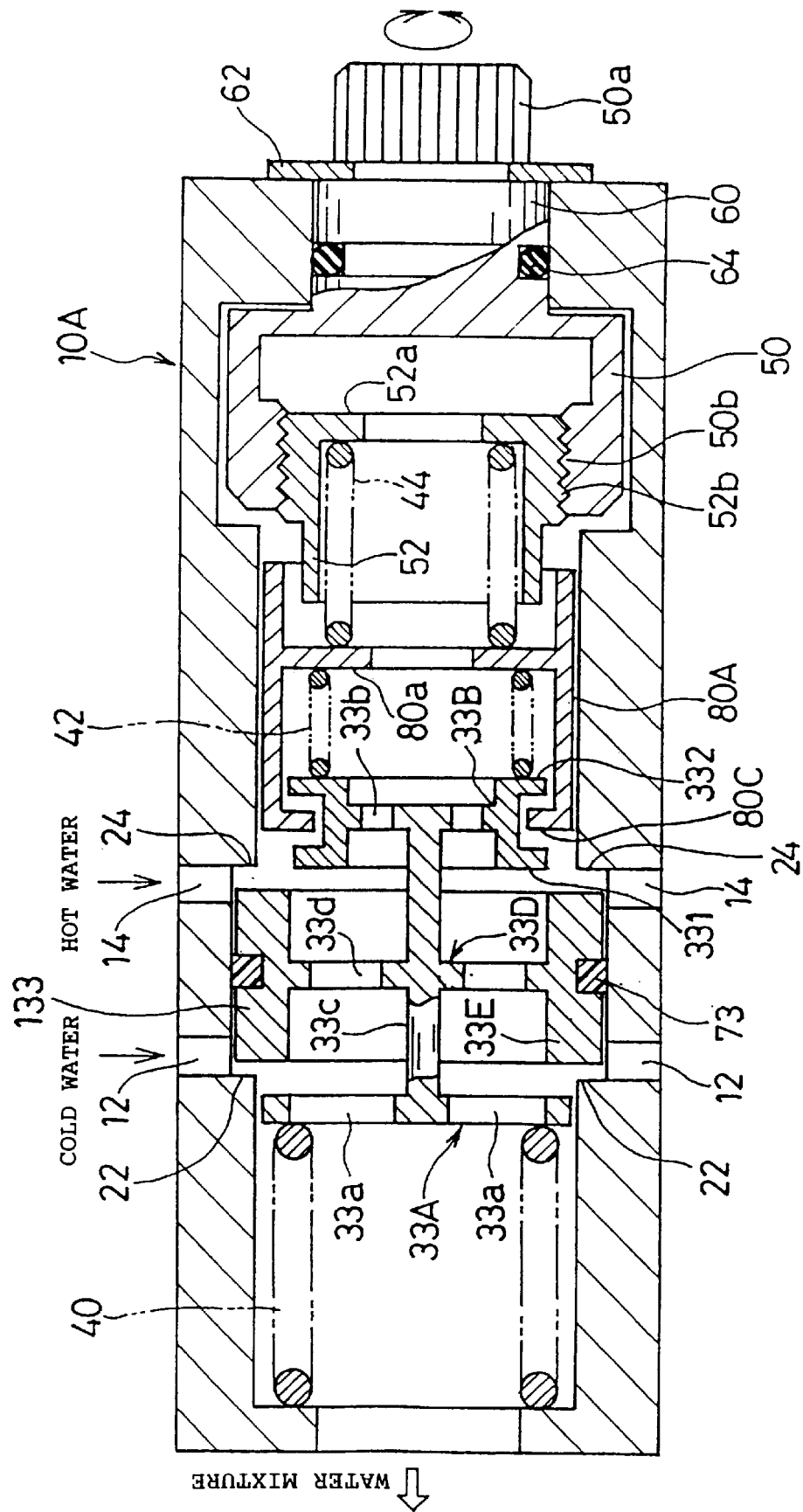
FIG. 7 is a sectional view showing a hot and cold water mixing device according to a third preferred embodiment.

Other structures of the hot and cold water mixing device of FIG. 7 are the same as those of the hot and cold water mixing device of FIG. 6 and parts similar or corresponding to the parts of the hot and cold water mixing device of FIG. 6 are marked by the same reference numerals.

I. In the hot and cold water mixing device of FIG. 7, when the target temperature of water mixture is set in the medium-temperature range from 30° C. to 50° C., both of the serially-arranged bias springs 42, 44 work so that a valve element 133 is pressed by a biasing force of the bias springs 42, 44 with a low spring constant. Accordingly, as shown in FIG. 4, the slope of the temperature line in the medium-temperature range is gentle.

II. When the target temperature of water mixture is set at a temperature exceeding 50° C., the slide shaft 52 is moved leftwards largely and the clutch column 80A is also moved leftwards so that the collar 80c is pressed against the left flange 331. In this case, the slide shaft 52 and the clutch column 80 are joined just like one member. Therefore, the valve element 133 is moved by balance between the rightward biasing force of the temperature-sensitive spring 40 and the leftward biasing force of the second bias spring 44.

Figure 4:
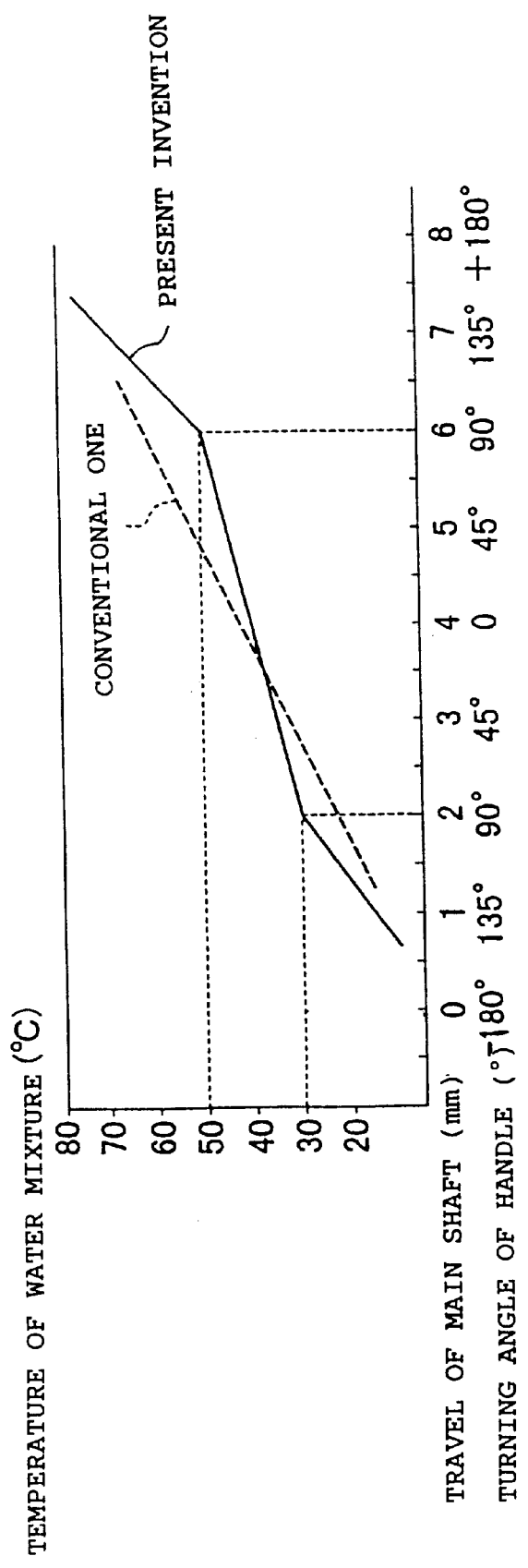
FIG. 4 is a graph showing operational characteristics of the hot and cold water mixing device shown in FIG. 1.

Since the spring constant of the second bias spring 44 is larger than the spring constant of the serially-combined bias springs 42, 44, the slope of the temperature line in the high-temperature range exceeding 50° C. is steeper than that in the medium-temperature range as shown in FIG. 4.

III. When the target temperature of water mixture is set at a temperature below 30° C., the slide shaft 52 is moved rightwards largely and the collar 80c of the clutch column 80A comes in contact with the right flange 332 so that the valve element 133 and the clutch column 80A are joined just like one member. In this state, since the clutch column 80A and the valve element 133 are moved substantially integrally with the slide shaft 52, the slope of the temperature line in the low-temperature range below 30° C. is steeper than that in the medium-temperature range as shown in FIG. 4.

In the preferred embodiment of FIG. 7, when the target temperature is set at a temperature exceeding 50° C., the slide shaft 52 may be pressed against the clutch column 80A in such a manner that the valve element 33 is moved by balance between the biasing force of the second bias spring 44 and the biasing force of the temperature-sensitive spring 40.

[Fourth Preferred Embodiment]

A hot and cold water mixing device according to the fourth preferred embodiment will be described with reference to FIG. 8.

This hot and cold water mixing device is similar to the hot and cold water mixing device of FIG. 6, but a projecting shaft 334 extending rightwards from the valve element 233 and having a flange (a stopper) 335 on the end of the projecting shaft 334 which can engage with a slide shaft 52 via a washer 85. The washer 85 is pressed against the left end surface of a collar 52a of the slide shaft 52 by a second bias spring 44.

Figure 8:
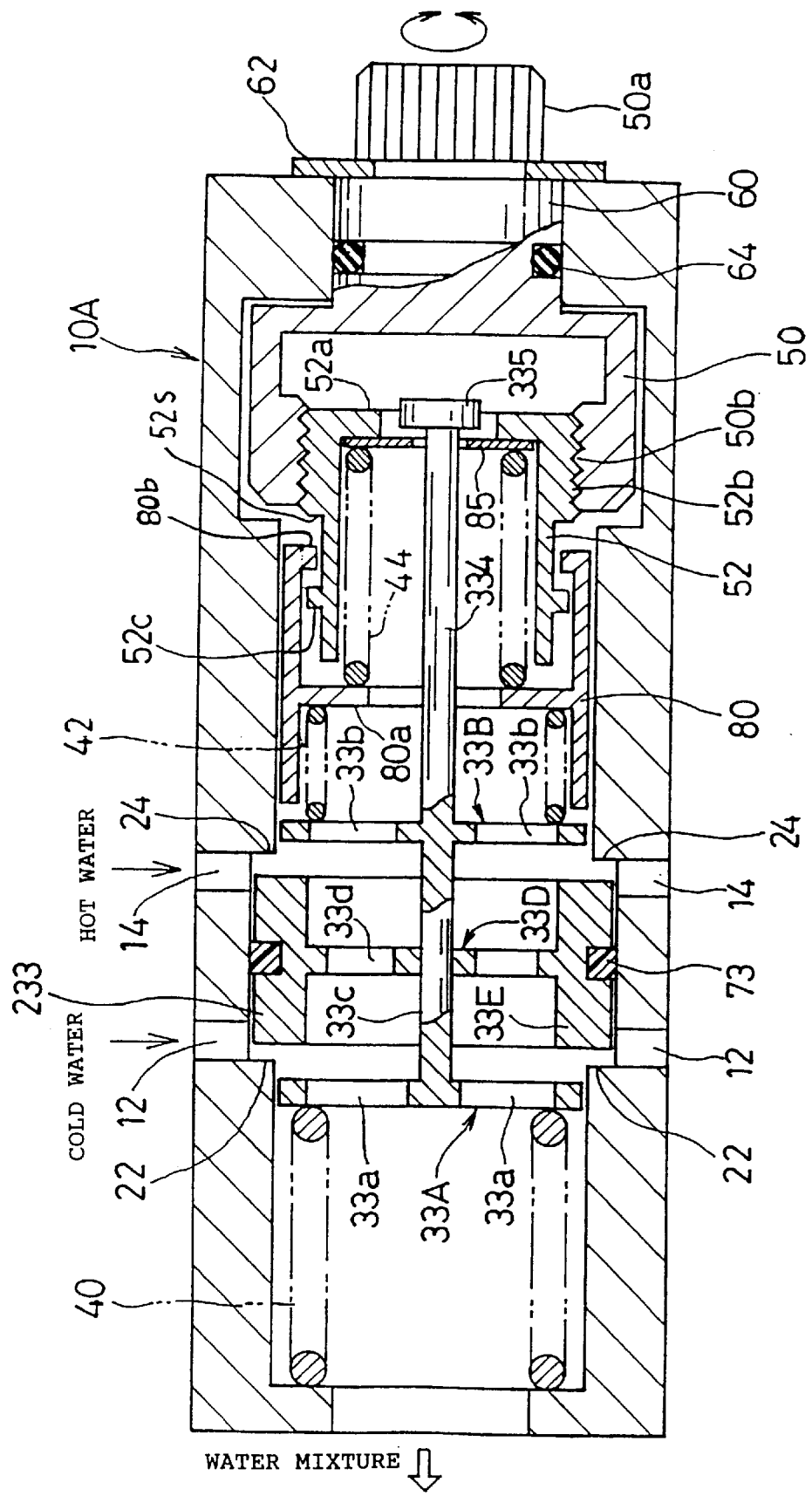
FIG. 8 is a sectional view showing a hot and cold water mixing device according to a fourth preferred embodiment.

Other structures of the hot and cold water mixing device of FIG. 8 are the same as those of the hot and cold water mixing device of FIG. 6, but the slide shaft 52 has an extension extending in the leftward direction from the left end thereof.

I. The operation of the hot and cold water mixing device of FIG. 8 when the target temperature of water mixture is set in the medium-temperature range is completely the same as the operation of the hot and cold water mixing device of FIG. 6. The valve element 233 is pressed leftwards by a biasing force of serially-combined bias springs 42, 44 with a low spring constant. In this state, the flange 335 is spaced apart from the washer 85 as shown in FIG. 8.

II. When the target temperature of water mixture is set at a temperature below 30° C., the slide shaft 52 is moved rightwards more than that of FIG. 8 so that collars 52c, 80b are engaged with each other and the clutch column 80 is thus drawn rightwards. The rightward movement of the slide shaft 52 brings the washer 85 in contact with the flange 335 so that the biasing force of the second bias spring 44 acts on the valve element 233 via the projecting shaft 334 in the rightward direction. That is to say, the valve element 233 is strongly biased rightwards by a concurrent biasing force produced by the biasing force of the temperature-sensitive spring 40 and the second bias spring 44. On the other hand, the biasing force applied to the valve element 233 leftwards is only the biasing force of the first bias spring 42. The ratio (a/A) between the travel (A) of the slide shaft 52 and the travel (a) of the valve element 233 is larger than that in case of the medium-temperature range. That is to say, the slope of the temperature line in the low-temperature range is steeper than that in the medium-temperature range.

It should be noted that during the handle is turn into the low-temperature range below 30° C., the collars 80b, 52c may come in contact with each other before, to the contrary, after, or at the same time as the contact between the washer 85 and the flange 335.

III. When the target temperature of water mixture is set at a temperature exceeding 50° C., the slide shaft 52 is moved leftwards largely. Accordingly, (1) the left end of the clutch column 80 comes in contact with the flange 33B;

(2) the left end of the slide shaft 52 comes in contact with the collar 80a of the clutch column 80; or (3) a step 52s of the slide shaft 52 comes in contact with the right end of the clutch column 80.

Therefore, the biasing force of either one of the bias springs 42, 44 is applied to the valve element 233 in the leftward direction. On the other hand, the biasing force applied to the valve element 233 in the rightward direction is only the biasing force of the temperature-sensitive spring 40. That is to say, the slope of the temperature line in the high-temperature range is steeper than that in the medium-temperature range as shown in FIG. 4.

[Fifth Preferred Embodiment]

A hot and cold water mixing device according to the fifth preferred embodiment will be described with reference to FIG. 9.

In this hot and cold water mixing device, just like the hot and cold water mixing device of FIG. 8, a projecting shaft 334 has a first flange 335 as a first stopper on the end of the projecting shaft 334 which can engage with a slide shaft 52 via a first washer 85 and the washer 85 is pressed against the left end surface of a collar 52a of a slide shaft 52 by a second bias spring 44. In FIG. 9, the projecting shaft 334 has a second flange 334F as a second stopper formed around an outer periphery thereof. In addition, a second washer 85A is disposed about the projecting shaft 334. The second washer 85A is superposed on the left surface of a collar 80a of a clutch column 80. The second flange 334F is sized to be allowed to freely pass through an inner hole of the collar 80a but not to pass through an inner hole of the second washer 85A. A first bias spring 42 is disposed between the second washer 85A and a flange 33B of the valve element 233 in the compressed state.

Figure 9:
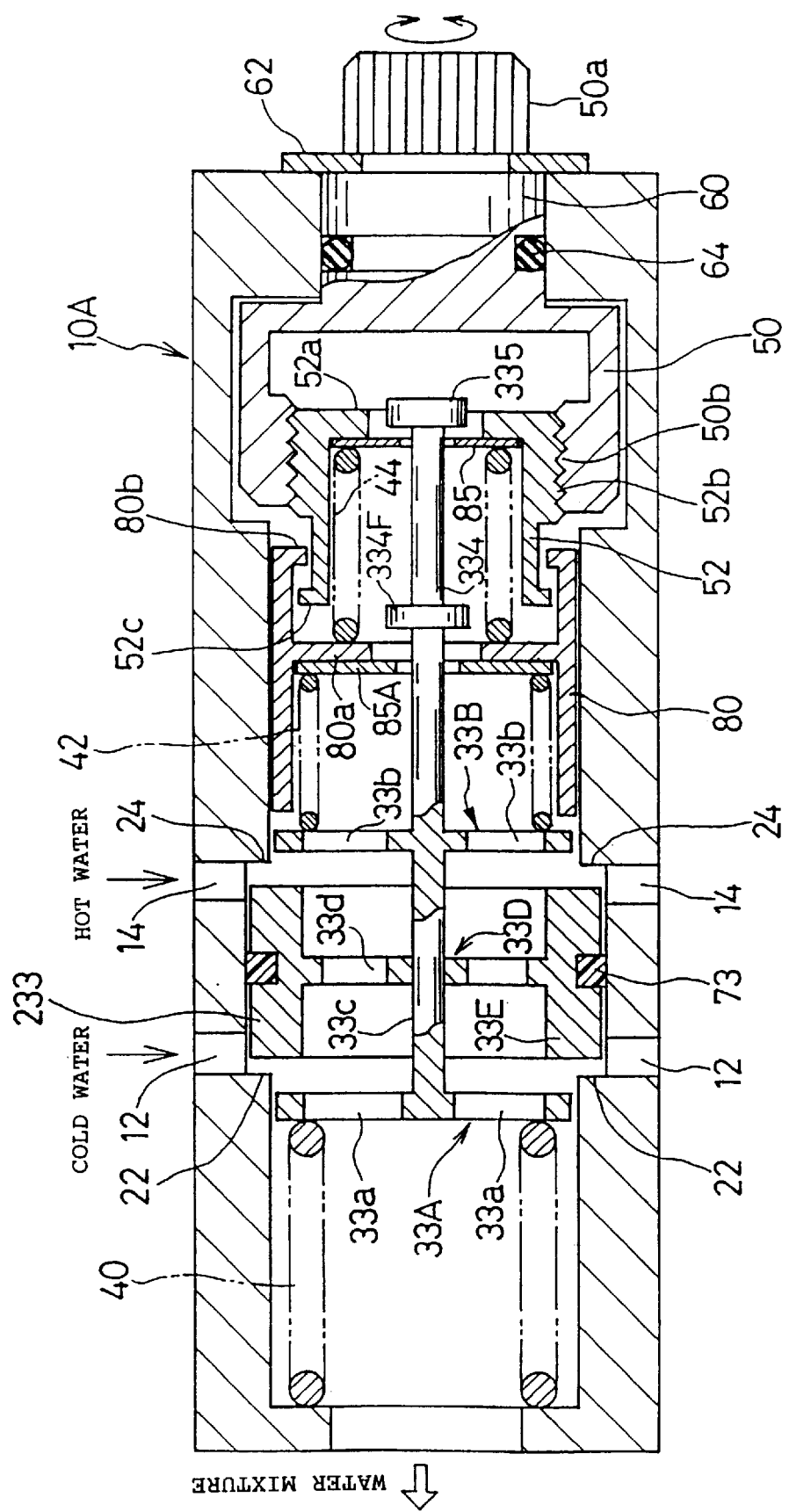
FIG. 9 is a sectional view showing a hot and cold water mixing device according to a fifth preferred embodiment.

Other structures of the hot and cold water mixing device of FIG. 9 are the same as those of the hot and cold water mixing device of FIG. 8.

I. The operation of the hot and cold water mixing device of FIG. 9 when the target temperature of water mixture is set in the medium-temperature range is completely the same as the operation of the hot and cold water mixing device of FIG. 8. The valve element 233 is pressed leftwards by a small biasing force of the first bias spring 42 and the second bias springs 44 which are serially combined to have a low spring constant. In this state, the flange 335 is spaced apart from the washer 85 as shown in FIG. 9 and the washer 85A is pressed against the collar 80a.

II. As the target temperature of water mixture is set at a temperature below 30° C., the slide shaft 52 is moved rightwards more than that of FIG. 9 so that collars 52c, 80b are engaged with each other and the clutch column 80 is thus drawn rightwards. The rightward movement of the slide shaft 52 brings the first washer 85 in contact with the first flange 335 so that the biasing force of the second bias spring 44 acts on the valve element 233 via the projecting shaft 334 in the rightward direction. That is to say, the valve element 233 is strongly biased rightwards by a concurrent biasing force of the biasing force of the temperature-sensitive spring 40 and the biasing force of the second bias spring 44. In this case, the rightward movement of the clutch column 80 brings the second washer 85A in contact with the second flange 334F so that the first bias spring 42 is in the locked state between the flanges 33B and 334F and thus does not apply any biasing force to the valve element 233 in the axial directions. Accordingly, the ratio (a/A) between the travel (A) of the slide shaft 52 and the travel (a) of the valve element 233 is larger than that in case of the medium-temperature range. That is to say, the slope of the temperature line in the low-temperature range is steeper than that in the medium-temperature range as shown in FIG. 4.

It should be noted that since the first bias spring 42 is in the locked state between the flanges 33B and 334F, the first bias spring 42 does not apply any biasing force to the slide shaft 52 too. (Applied to the slide shaft 52 is the biasing force of the second bias spring 44 only.) Therefore, a rotational shaft 50 is allowed to be smoothly rotated with a small torque.

III. When the target temperature of water mixture is set at a temperature exceeding 50° C., the slide shaft 52 is moved leftwards largely. The second flange 334F of the projecting shaft 334 comes in contact with the second washer 85A so that the first bias spring 42 is in the locked state between the flanges 334F and 33B and thus does not apply any biasing force to the valve element 233 in the axial directions. Applied to the valve element 233 in the leftward direction is the biasing force of the second bias spring 44 only. Applied to the valve element 233 in the rightward direction is the biasing force of the temperature-sensitive spring 40 only. Accordingly, the slope of the temperature line in the high-temperature range is steeper than that in the medium-temperature range as shown in FIG. 4.

[Sixth Preferred Embodiment]

A hot and cold water mixing device according to the sixth preferred embodiment will be described with reference to FIG. 10.

This hot and cold water mixing device is similar to the hot and cold water mixing device of FIG. 7, but a projecting shaft 522 extending leftwards from the slide shaft 52 and having a flange (a stopper) 552 on the end of the projecting shaft 522 which can engage with a valve element 333 via a washer 87. The washer 87 is pressed against the right end surface of a flange 332 of the valve element 333 by a first bias spring 42. Other structures of the valve element 333 are the same as those of the valve element 133 of FIG. 7, except that the flange 33B is positioned more left than that of the valve element 133.

Figure 10:
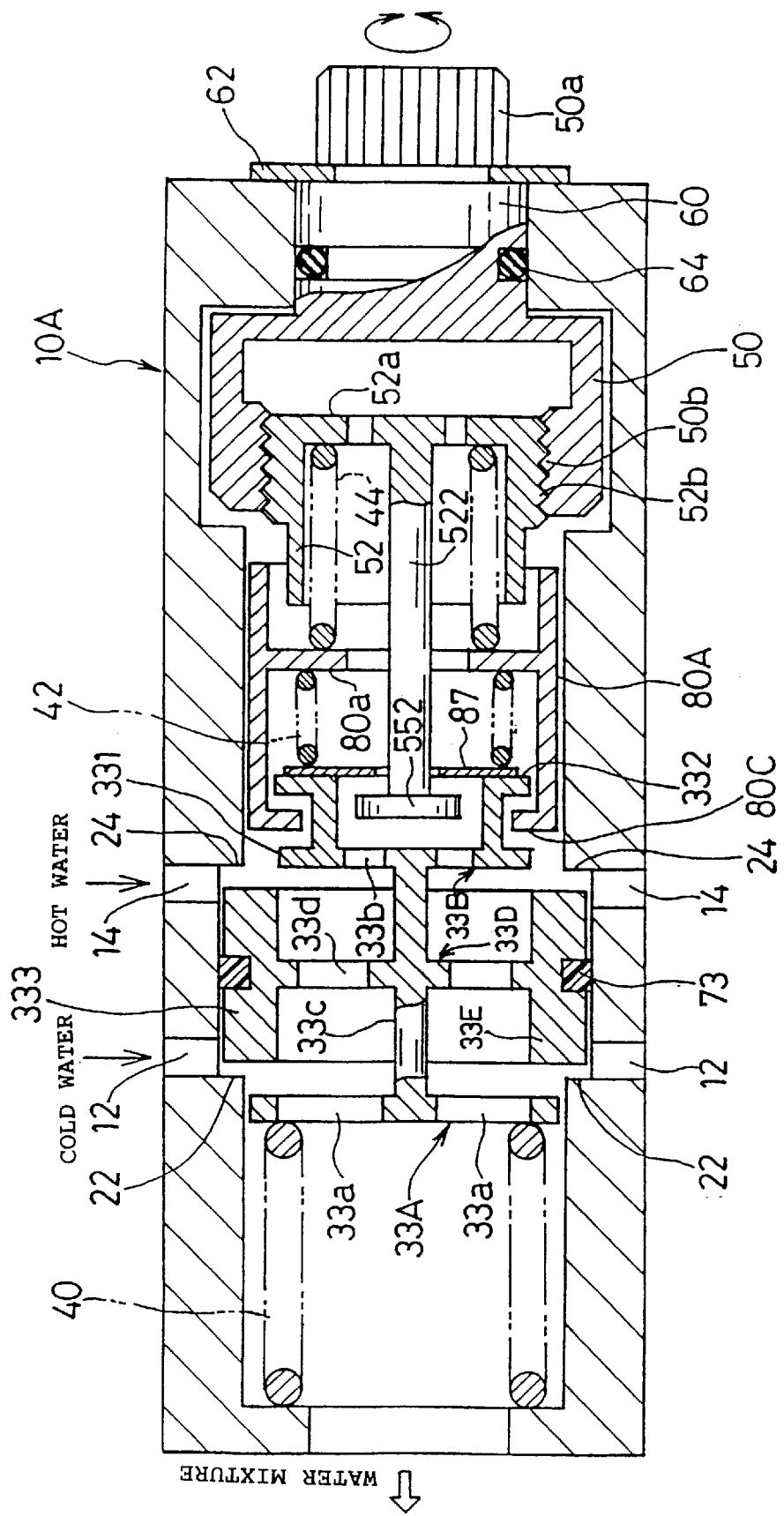
FIG. 10 is a sectional view showing a hot and cold water mixing device according to a sixth preferred embodiment.

Other structures of the hot and cold water mixing device of FIG. 10 are the same as those of the hot and cold water mixing device of FIG. 7.

I. The operation of the hot and cold water mixing device of FIG. 10 when the target temperature of water mixture is set in the medium-temperature range is completely the same as the operation of the hot and cold water mixing device of FIG. 7. The valve element 333 is pressed leftwards by a first bias spring 42 and a second bias springs 44 in series. Since the spring constant of this serially combined springs is small, the slope of the temperature line in the medium-temperature range is gentle as shown in FIG. 4.

II. As the target temperature of water mixture is set at a temperature below 30° C., the slide shaft 52 is moved rightwards more than that of FIG. 10 so that the flange 552 comes in contact with the washer 87. A clutch column 80A is also moved rightwards so that a collar 80c thereof comes in contact with the right flange 332 of the valve element 333. In this state, the biasing force of the first bias spring 42 is applied to the valve element 333 via the clutch column 80A in the rightward direction. Applied to the valve element 333 are the total (concurrent) biasing force of a temperature-sensitive spring 40 and the first bias spring 42 in the rightward direction, and the biasing force of the second bias spring 44 in the leftward direction.

When the target temperature is set in the low-temperature range, as mentioned above, the rightward biasing force of the first bias spring 42 is added to the rightward biasing force of the temperature-sensitive spring 40. As a result, the biasing force applied to the valve element 333 in the rightward direction becomes significantly large, so the ratio (a/A) between the travel (A) of the slide shaft 52 and the travel (a) of the valve element 333 is larger than that in case of the medium-temperature range. That is to say, the slope of the temperature line in the low-temperature range below 30° C. is steeper than that in the medium-temperature range as shown in FIG. 4.

III. When the target temperature of water mixture is set at a temperature exceeding 50° C., the slide shaft 52 is moved leftwards largely. Accordingly, (1) the collar 80c of the clutch column 80A comes in contact with the left flange 331 of the valve element 333; or
(2) the left end of the slide shaft 52 comes in contact with the collar 80a of the clutch column 80A.

Therefore, the valve element 333 and the clutch column 80A, or the slide shaft 52 and the clutch column 80A are joined just like one member. In this state, the valve element 333 is biased by the temperature-sensitive spring 40 in the rightward direction, while the valve element is biased by one of the bias springs 42, 44 in the leftward direction.

The spring constant of one of the bias springs 42, 44 is larger than the spring constant of the bias springs 42, 44 serially combined. Therefore, the slope of the temperature line in the high-temperature range exceeding 50° C. is steeper than that in the medium-temperature range as shown in FIG. 4.

[Seventh Preferred Embodiment]

A hot and cold water mixing device according to the seventh preferred embodiment will be described with reference to FIG. 11.

In this hot and cold water mixing device, just like the hot and cold water mixing device of FIG. 10, a slide shaft 52 has a projecting shaft 522 extending leftwards which has a first flange (a first stopper) 552 on the end of the projecting shaft 552 which can engage with a valve element 333 via a first washer 87 and the washer 87 is pressed against the right end surface of a flange 332 of the valve element 333 by a first bias spring 42.

Figure 11:
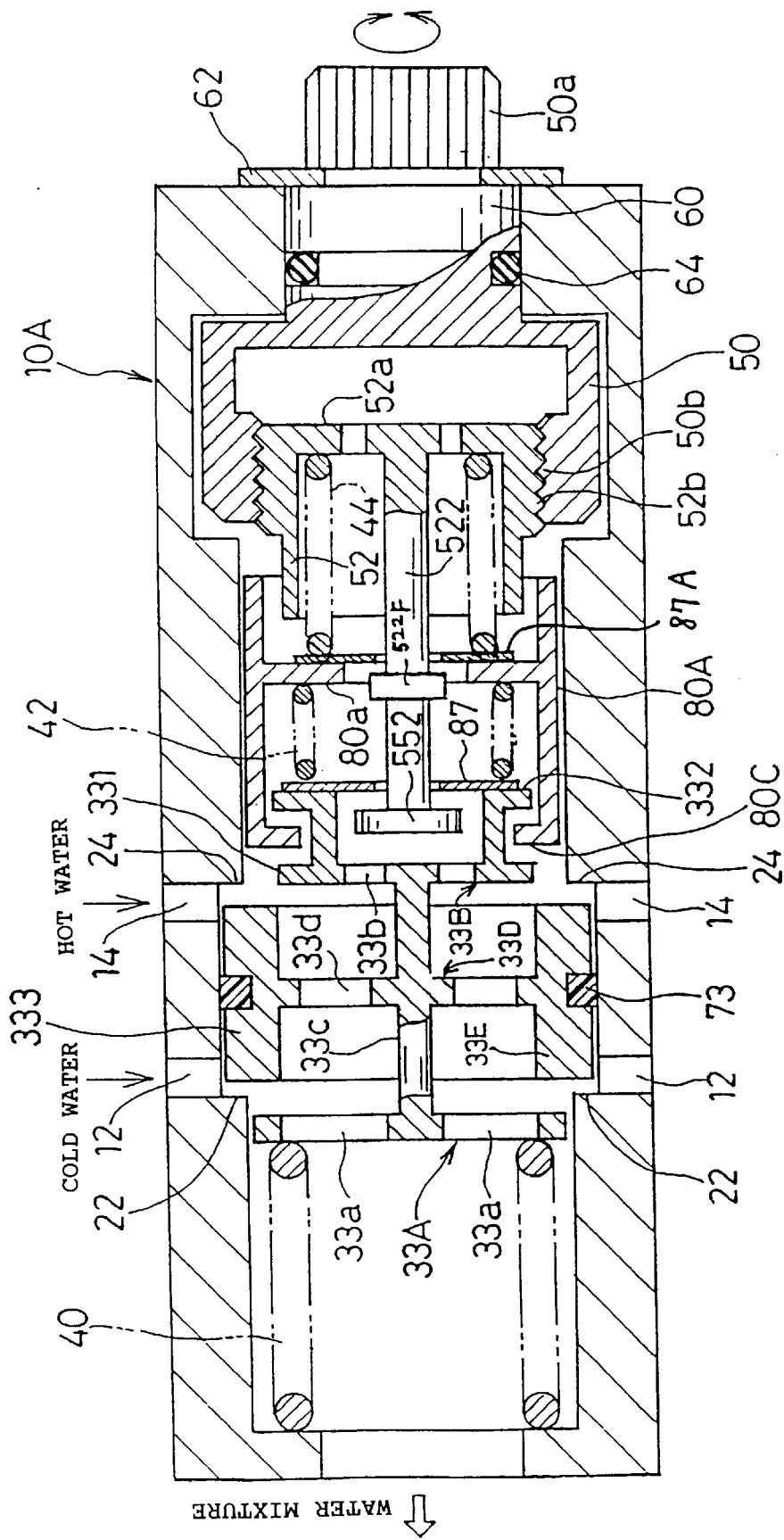
FIG. 11 is a sectional view showing a hot and cold water mixing device according to a seventh preferred embodiment.

In this preferred embodiment of FIG. 11, the projecting shaft 522 has a second flange 522F as a second stopper. In addition, a second washer 87A is disposed about the projecting shaft 522. The second washer 87A is pressed against the right end surface of the collar 80a of the clutch column 80A by the second biasing spring 44 on the right side.

It should be noted that the second flange 522F is positioned more left than the second washer 87A.

The second flange 522F is sized to be allowed to freely pass through an inner hole of a collar 80a but not to pass through an inner hole of the second washer 87A.

Other structures of the hot and cold water mixing device of FIG. 11 are the same as those of the hot and cold water mixing device of FIG. 10.

I. The operation of the hot and cold water mixing device of FIG. 11 when the target temperature of water mixture is set in the medium-temperature range is completely the same as the operation of the hot and cold water mixing device of FIG. 10. The valve element 333 is biased leftwards by the first bias spring 42 and the second bias springs 44 in series. Since the spring constant of this serially combined biasing springs is small, the slope of the temperature line in the medium-temperature range is gentle as shown in FIG. 4.

II. As the target temperature of water mixture is set at a temperature below 30° C., the slide shaft 52 is moved rightwards more than that of FIG. 11 so that the second flange 552 comes in contact with the first washer 87. A clutch column 80A is also moved rightwards so that a collar 80c thereof comes in contact with the right flange 332 of the valve element 333. In this state, the biasing force of the first bias spring 42 is applied to the valve element 333 via the clutch column 80A in the rightward direction. Applied to the valve element 333 are the total (concurrent) biasing force of a temperature-sensitive spring 40 and the first bias spring 42 in the rightward direction.

Further in this case, the projecting shaft 522 is moved rightwards together with the slide shaft 52 so that the second flange 522F comes in contact with the second washer 87A, thus moving rightwards the second washer 87A apart from the collar 80a. As a result, the second bias spring 44 becomes in the locked state between the flange 522F and the collar 52a and thus does not apply any biasing force to the valve element 333.

When the target temperature is set in the low-temperature range, as mentioned above, the rightward biasing force of the first bias spring 42 is added to the rightward biasing force of the temperature-sensitive spring 40. As a result, the biasing force applied to the valve element 333 in the rightward direction becomes significantly large and the leftward biasing force of the second bias spring 44 is cancelled. Accordingly, the ratio (a/A) between the travel (A) of the slide shaft 52 and the travel (a) of the valve element 333 is larger than that in case of the medium-temperature range. That is to say, the slope of the temperature line in the low-temperature range below 30° C. is steeper than that in the medium-temperature range as shown in FIG. 4.

It should be noted that since the second bias spring 44 does not apply any biasing force to the slide shaft 52, a rotational shaft 50 is allowed to be smoothly rotated with a small torque.

III. When the target temperature of water mixture is set at a temperature exceeding 50° C., the slide shaft 52 is moved leftwards largely. Accordingly, (1) the collar 80c of the clutch column 80A comes in contact with the left flange 331 of the valve element 333; or (2) the left end of the slide shaft 52 comes in contact with the collar 80a of the clutch column 80A.

Therefore, the valve element 333 and the clutch column 80A, or the slide shaft 52 and the clutch column 80A are joined just like one member. In this state, the valve element 333 is moved according to the balance between the biasing force of the temperature-sensitive spring 40 and the biasing force of one of the bias springs 42, 44.

The spring constant of one of the bias springs 42, 44 is larger than the spring constant of the serially combined bias springs 42, 44. Therefore, the slope of the temperature line in the high-temperature range exceeding 50° C. is steeper than that in the medium-temperature range as shown in FIG. 4.

[Eighth Preferred Embodiment]

Figure 12:
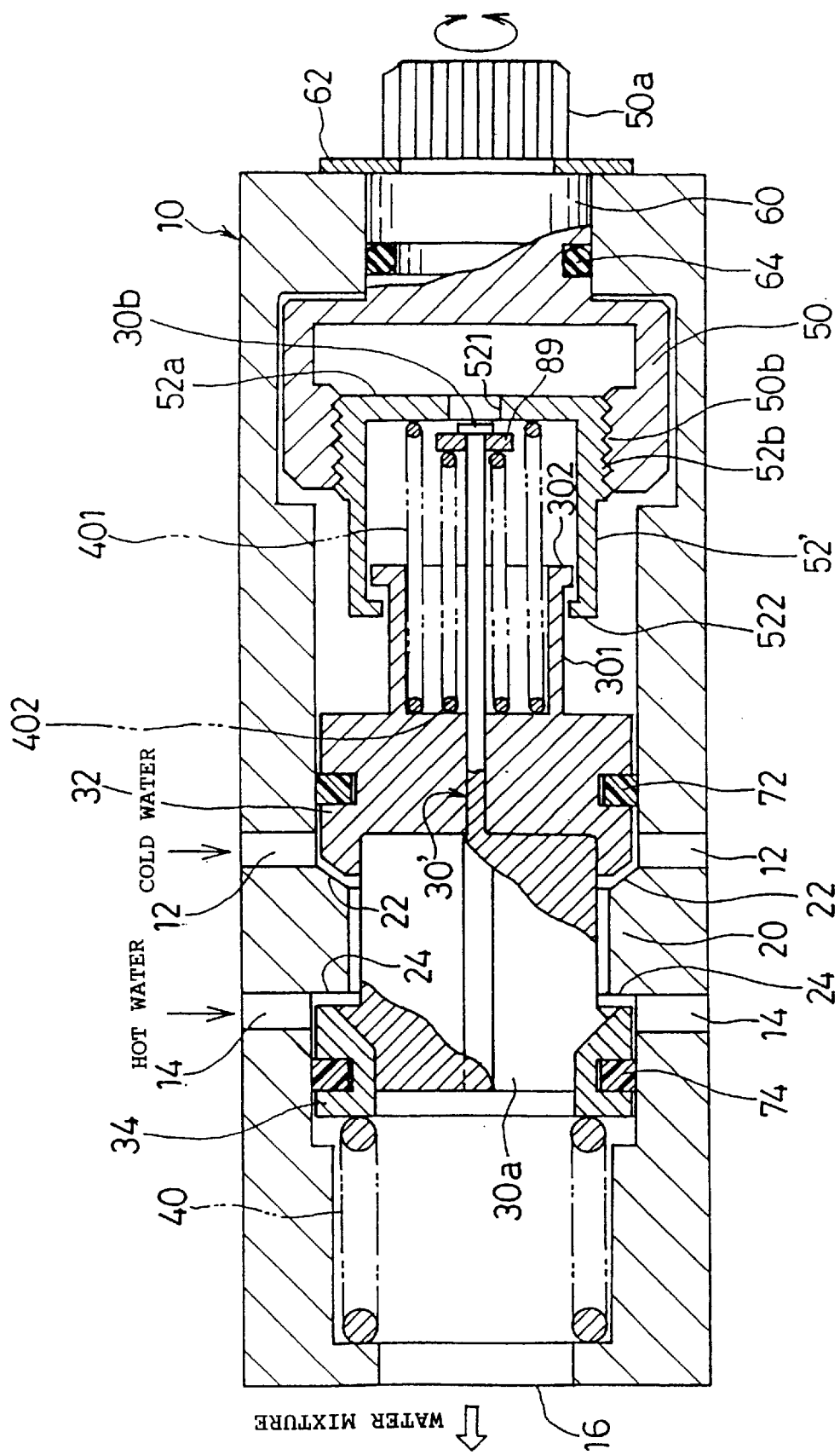
FIG. 12 is a sectional view showing a hot and cold water mixing device according to an eighth preferred embodiment.

The eighth preferred embodiment will be described with reference to FIG. 12. In a hot and cold water mixing device according to this preferred embodiment, bias springs are arranged in parallel. In this preferred embodiment, a first bias spring 401 is disposed between a cold water valve element 32 and a collar 52a of a slide shaft 52'. A main shaft 30' passing through the cold water valve element 32 has a right flange 30b which is sized to be allowed to pass through a hole 521 of the collar 52a. A washer 89 is stopped by the flange 30b. A second bias spring 402 is disposed between the washer 89 and the cold water valve element 32. The washer 89 is sized to be not allowed to pass through the hole 521 and is positioned on the left of the collar 52a as shown in FIG. 12 when water mixture at a temperature within the medium-temperature range is discharged. The cold water valve element 32 has a cylindrical hook 301 extending rightwards from the right end thereof and a pawl 302 as a stopping member formed on the end of the hook 301. The pawl 302 can be engaged with a collar 522 convexly formed on an inner surface the slide shaft 52'.

It should be noted that the hook 301 is formed in cylindrical shape and the pawl 302 is convexly formed in a collar-like shape on an outer surface of the hook 301 according to this preferred embodiment. The pawl 302 is positioned more right than the collar 522 as shown in FIG. 12.

Other structures of this hot and cold water mixing device are the same as those of the hot and cold water mixing device of FIGS. 1 through 3 and parts similar or corresponding to the parts of the hot and cold water mixing device of FIGS. 1 through 3 are marked by the same reference numerals.

The operation of the hot and cold water mixing device structured as mentioned above with reference to FIG. 12 will be described hereinafter.

I. When the Target Temperature of Water Mixture is Set in the Medium-temperature Range From 30° C. to 50° C. (see FIG. 12)

When the target temperature of water mixture is set at a temperature, for example, in the medium-temperature range from 30° C. to 50° C. as shown in FIG. 12, only the biasing force of the first bias spring 401 is applied to the main shaft 30' via the cold water valve element 32 in the leftward direction and the biasing force of the temperature-sensitive spring 40 is applied to the main shaft 30' via a hot water valve element 34 in the rightward direction. These biasing forces balance with each other. The biasing force of the second bias spring 402 acts on the cold water valve element 32 and the main shaft 30' in the leftward and rightward directions but does not act on the valve elements 32, 34 in the leftward and rightward directions not at all.

In this state, when the actual temperature of water mixture becomes lower than the preset target temperature due to a variation in the supply temperature or the supply pressure of hot water, the temperature-sensitive spring 40 contracts so that the valve elements 32, 34 and the main shaft 30' are moved leftwards and a flow space for cold water between a cold water valve seat 22 and the cold water valve element 32 is reduced while a flow space for hot water between a hot water valve seat 24 and the hot water valve element 34 is increased, thereby returning (rising) the actual temperature of water mixture to the preset target temperature. To the contrary, when the actual temperature of water mixture becomes higher than the preset target temperature, the temperature-sensitive spring 40 expands so that the cold water valve element 32 and the hot water valve element 34 are moved rightwards together with the main shaft 30' so as to increase the flow space for cold water and reduce the flow space for hot water, thereby returning (lowering) the actual temperature of water mixture to the preset target temperature.

When the handle is turned in the positive direction to increase the target temperature of water mixture to another temperature within the medium-temperature range, the slide shaft 52' is moved leftwards in such a range not to bring the collar 52a in contact with the washer 89. Accordingly, the biasing force of the first bias spring 401 in the leftward direction is increased so that the valve elements 32, 34 shift leftward together with the main shaft 30' so as to increase the flow space for hot water and to reduce the flow space for cold water, thereby increasing the temperature of water mixture. After the valve elements 32, 34 are shifted, the rightward biasing force of the temperature-sensitive spring 40 and the leftward biasing force of the bias spring 401 balance with each other. When the actual temperature of water mixture deviates from the preset target temperature, the temperature-sensitive spring 40 expands or contracts, thereby returning the actual temperature of water mixture to the preset target temperature.

When the handle is turned in the opposite direction to decrease the target temperature of water mixture to another temperature within the medium-temperature range, the slide shaft 52' is moved rightwards in such a range not to bring the collar 522 in contact with the pawl 302 so that the valve elements 32, 34 shift rightward together with the main shaft 30' so as to reduce the flow space for hot water and increase the flow space for cold water, thereby lowering the temperature of water mixture. After the valve elements 32, 34 are shifted, the rightward biasing force of the temperature-sensitive spring 40 and the leftward biasing force of the bias spring 401 balance with each other. When the actual temperature of water mixture deviates from the preset target temperature, the temperature-sensitive spring 40 expands or contracts, thereby returning the actual temperature of water mixture to the preset target temperature.

As mentioned above, when the target temperature of water mixture is set to any temperature in the medium-temperature range from 30° C. to 50° C., only the bias springs 401 works. Assuming that the spring constants of the bias springs 401, 402 are $k_1$, $k_2$, respectively, the force pressing the main shaft 30 leftwards is $k_1$ which is smaller than the concurrent biasing force of the bias springs 401, 402 explained by $(k_1+k_2)$.

Accordingly, when the preset target temperature is in the medium-temperature range, a ratio (a/A) between the travel (A) of the slide shaft 52' and the travel (a) of the valve elements 32, 34 is relatively small. That is to say, the travel (a) of the valve elements 32, 34 per a unit angle of the rotational shaft 50 is relatively small. As a result, as shown by solid line in FIG. 4, the amount in change of the target temperature per the unit angle of the handle is small when the target temperature of water mixture is set in the medium-temperature range, that is, in the graph of FIG. 4, the slope of a temperature line in the medium-temperature range is gentle.

II. When the Target Temperature of Water Mixture is Set in the High-temperature Range Exceeding 50° C.

When the target temperature of water mixture is set at a temperature exceeding 50° C., the slide shaft 52' is moved leftwards largely so that the collar 52a of the slide shaft 52' presses the washer 89 leftwards and the washer 89 is thus spaced apart from the flange 30b of the main shaft 30' leftwards. Therefore, when the handle is turned to enter into the high temperature range exceeding 50° C., the slide shaft 52' biases the main shaft 30' by the concurrent biasing force of the bias springs 401, 402 leftwards. The spring constant of the bias springs 401, 402 arranged in parallel is $k_1+k_2$ which is larger than the spring constant $k_1$ in case of the medium-temperature range. Accordingly, the ratio (a/A) between the travel (A) of the slide shaft 52' and the travel (a) of the valve elements 32, 34 is larger than that in case of the medium-temperature range. That is to say, the amount m change of the target temperature per the unit angle of the handle is larger than that in case of the medium-temperature range. Therefore, in the graph of FIG. 4, the slope of the temperature line in the high-temperature range is steeper than that in the medium-temperature range.

III. When the Target Temperature of Water Mixture is Set in the Low-temperature Range Below 30° C.

When the target temperature of water mixture is set at a temperature below 30° C., the slide shaft 52' is moved rightwards largely and the collar 522 of the slide shaft 52' and the pawl 302 of the hook 301 are engaged with each other so that the biasing force of the bias spring 401 does not act on the cold water valve element 32. In this case, the slide shaft 52' and the cold water valve element 32 are moved integrally with each other. Accordingly, the ratio (a/A) between the travel (A) of the rotational shaft 50 and the slide shaft 52' and the travel (a) of the valve elements 32, 34 is larger than that in case of the medium-temperature range. That is to say, the amount in change of the target temperature per the unit angle of the handle is larger than that in case of the medium-temperature range. Therefore, in the graph of FIG. 4, the slope of the temperature line in the low-temperature range is steeper than that in the medium-temperature range.

It should be noted that when the slide shaft 52' is further moved rightwards by further turning the handle into the low-temperature range after the hot water valve element 34 comes in contact with the hot water valve seat 24, the cruciform portion 30a and the cold water valve element 32 are spaced apart from each other.

[Ninth Preferred Embodiment]

The ninth preferred embodiment will be described with reference to FIG. 13. In this preferred embodiment, just like the embodiment of FIG. 6, one valve element 433 is adapted to regulate both of a flow space for cold water and a flow space for hot water.

The valve element 433 comprises a column 335 extending rightward from a flange 33B thereof and first and second collars 336, 337 convexly formed on an outer surface of the column 335. The second collar 337 is positioned at the right end of the column 335. Disposed between the collars 336 and 337 are first and second washers 91, 92. A first bias spring 42 is disposed between the washers 91 and 92 in the compressed state. The first washer 91 is sized to be caught by the a collar 526 described later.

A slide shaft 520 has a cylindrical portion 525 extending leftwards and the collar 526 formed inwardly at the left end of the cylindrical portion 525. The collar 526 is positioned more left than the aforementioned first collar 336. The inner diameter of the collar 526 is larger than the outer diameter of the collar 336.

The slide shaft 520 is formed with a step 527 to be positioned more right than the aforementioned collar 337. The slide shaft 520 is formed such that the inner diameter of a right portion from the step 527 is reduced. The second collar 337 has an outer diameter smaller than the reduced-diameter portion of the slide shaft 520 so that the second collar 337 is never caught by the step 527. The washer 92 superposed on this collar 337 is sized to be caught by the step 527.

A second bias spring 44 is disposed between the flange 33B of the valve element 433 and a collar 52a of the slide shaft 520.

Figure 13:
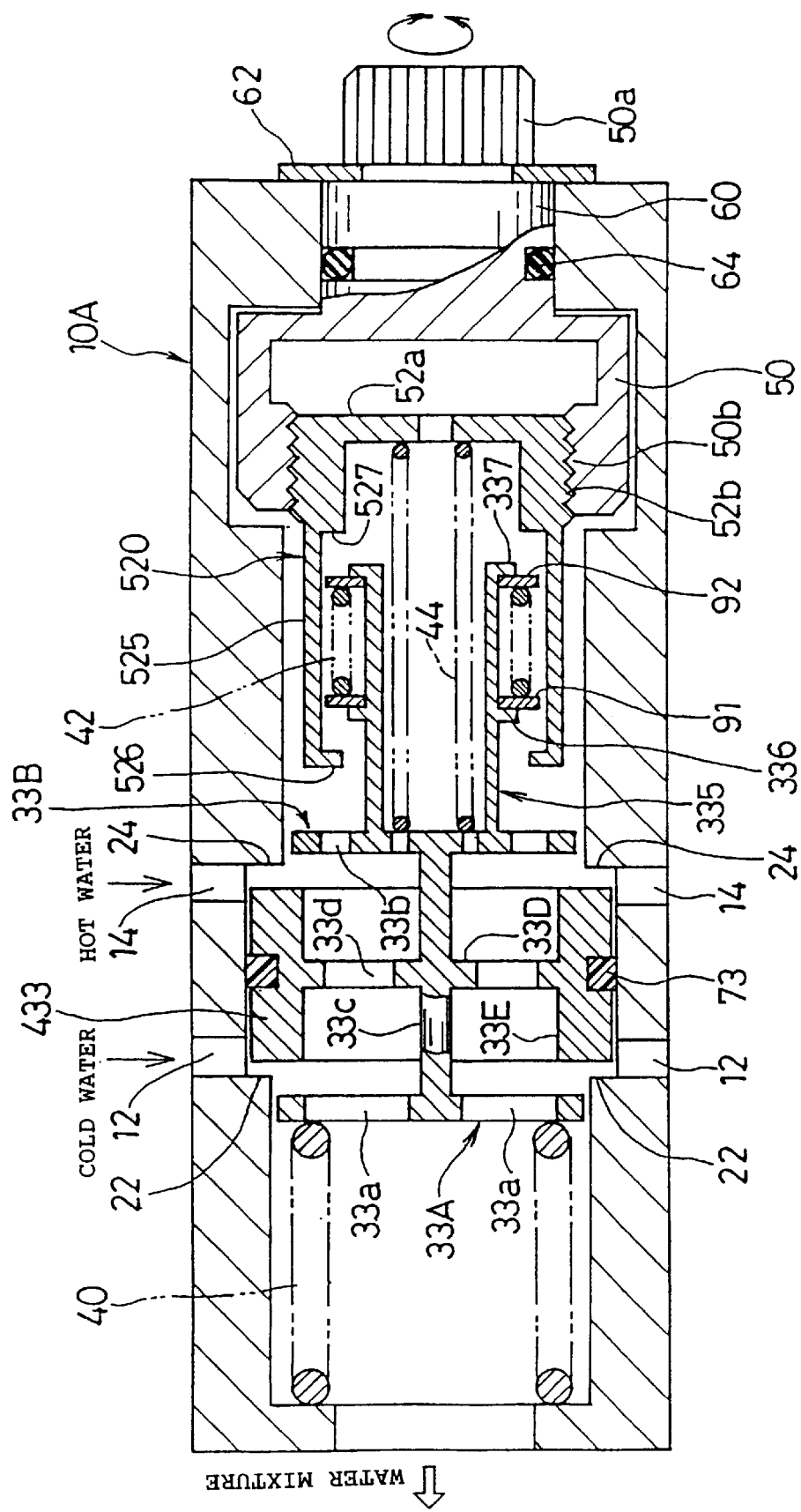
FIG. 13 is a sectional view showing a hot and cold water mixing device according to a ninth preferred embodiment.

Other structures of the hot and cold water mixing device of FIG. 13 are the same as those of the hot and cold water mixing device of FIG. 6 and parts similar or corresponding to the parts of the hot and cold water mixing device of FIG. 6 are marked by the same reference numerals.

The operation of the hot and cold water mixing device structured as mentioned above with reference to FIG. 13 will be described hereinafter.

I. When the Target Temperature of Water Mixture is Set in the Medium-temperature Range From 30° C. to 50° C.

FIG. 13 shows the hot and cold water mixing device in a state that the target temperature of water mixture is set at a temperature, for example, in the medium-temperature range from 30° C. to 50° C. In this state, only the biasing force of the second bias spring 44 is exerted leftwards to the valve element 433, while a biasing force of a temperature-sensitive spring 40 is exerted rightwards to the valve element 433. These biasing forces balance with each other. Since the first bias spring 42 is disposed between the collars 336 and 337, the first bias spring 42 does not apply any biasing force to the valve element 433.

In this state, when the actual temperature of water mixture becomes lower than the preset target temperature due to a variation in the supply temperature or the supply pressure of hot water, the temperature-sensitive spring 40 contracts so that the valve element 433 is moved leftwards and a flow space for cold water between a cold water valve seat 22 and the valve element 433 is reduced while a flow space for hot water between a hot water valve seat 24 and the valve element 433 is increased, thereby returning (rising) the actual temperature of water mixture to the preset target temperature. To the contrary, when the actual temperature of water mixture becomes higher than the preset target temperature, the temperature-sensitive spring 40 expands so that the valve element 433 are moved rightwards so as to increase the flow space for cold water and reduce the flow space for hot water, thereby returning (lowering) the actual temperature of water mixture to the preset target temperature.

When the handle is turned in the positive direction to increase the target temperature of water mixture to another temperature within the medium-temperature range, the slide shaft 520 is moved leftwards within a range not to bring the step 527 in contact with the washer 92. As a result of this, the biasing force of the second bias spring 44 in the leftwards direction is increased. Therefore, the bias spring 44 shifts the valve element 433 leftwards so as to increase the flow space for hot water and reduce the flow space for cold water, thereby increasing the temperature of water mixture. After the valve element 433 is shifted, the rightward biasing force of the temperature-sensitive spring 40 and the leftward biasing force of the second bias spring 44 balance with each other. When the actual temperature of water mixture deviates from the preset target temperature, the temperature-sensitive spring 40 expands or contracts, thereby returning the actual temperature of water mixture to the preset target temperature.

When the handle is turned in the opposite direction to decrease the target temperature of water mixture to another temperature within the medium-temperature range, the slide shaft 520 is moved rightwards within a range not to bring the collar 526 in contact with the washer 91. As a result of this, the valve element 433 is shifted rightwards together with the second bias spring 44 so as to reduce the flow space for hot water and increase the flow space for cold water, thereby lowering the temperature of water mixture. After the valve element 433 is shifted, the rightward biasing force of the temperature-sensitive spring 40 and the leftward biasing force of the second bias spring 44 balance with each other. When the actual temperature of water mixture deviates from the preset target temperature, the temperature-sensitive spring 40 expands or contracts, thereby returning the actual temperature of water mixture to the preset target temperature.

As mentioned above, when the target temperature of water mixture is set to any temperature in the medium-temperature range from 30° C. to 50° C., only the second bias spring 44 works to press the valve element 433 leftward by the biasing force of the second bias spring 44 of which spring constant is smaller than that of the parallel bias springs 42, 44. Therefore, just like the hot and cold water mixing device of FIGS. 1 through 3, in the graph of FIG. 4, the slope of a temperature line in the medium-temperature range is gentle.

II. When the Target Temperature of Water Mixture is Set in the High-temperature Range Exceeding 50° C.

When the target temperature of water mixture is set at a temperature exceeding 50° C., the slide shaft 520 is moved leftwards largely so that the step 527 comes in contact with the washer 92 and then moves the washer 92 leftwards. As a result of this, the bias springs 42, 44 work in parallel to press the valve element 433 leftwards. Accordingly, the ratio (a/A) between the travel (A) of the slide shaft 520 and the travel (a) of the valve element 433 is larger than that in case of the medium-temperature range. That is to say, the amount in change of the target temperature per the unit angle of the handle is larger than that in case of the medium-temperature range. Therefore, in the graph of FIG. 4, the slope of the temperature line in the high-temperature range is steeper than that in the medium-temperature range.

III. When the Target Temperature of Water Mixture is Set in the Low-temperature Range Below 30° C.

When the target temperature of water mixture is set at a temperature below 30° C., the slide shaft 520 is moved rightwards largely so that the collar 526 comes in contact with the washer 91 and then moves the washer 91 rightward. As a result of this, the concurrent (total) biasing force of the temperature-sensitive spring 40 and the first bias spring 42 is applied to the valve element 433 rightwards and the biasing force of the second bias spring 44 is applied to the valve element 433 leftwards. Therefore, the ratio (a/A) between the travel (A) of the rotational shaft 50 and the slide shaft 520 and the travel (a) of the valve element 433 when the handle is turned within the low-temperature range below 30° C. is larger than that in case of the medium-temperature range. That is to say, the amount in change of the target temperature per the unit angle of the handle is larger than that in case of the medium-temperature range. Therefore, in the graph of FIG. 4, the slope of the temperature line in the low-temperature range is steeper than that in the medium-temperature range.

As described above, the hot and cold water mixing device according to the present invention can have a wider indication range for the medium-temperature range, thereby allowing the fine control for setting the target temperature of water mixture. In addition, according to the present invention, the temperature control from the low-temperature range to the high-temperature range can be obtained without increasing the entire range for the rotation of the temperature regulating handle.

[Tenth Preferred Embodiment]

Figure 14:
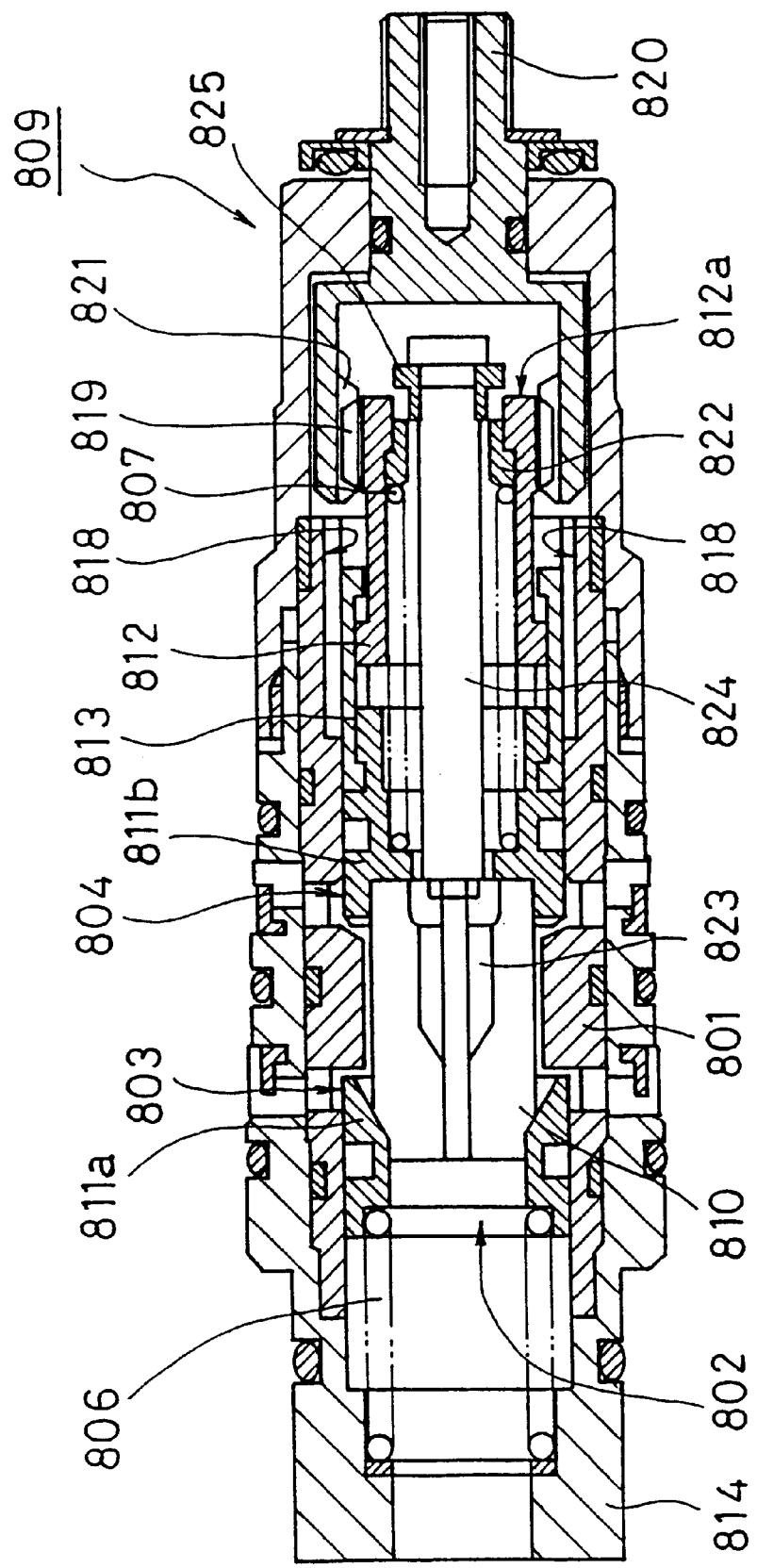
FIG. 14 is a sectional plan view showing a hot and cold water mixing device according to a tenth preferred embodiment.

A control mechanism of a hot and cold water mixing device 809 according to the tenth preferred embodiment will be described with reference to FIGS. 14 through 18(B). As shown in FIG. 14, the hot and cold water mixing device 809 comprises a main casing 814 composed of two cylindrical members which are connected to each other by threads, and a valve casing 801 fitted inside the main casing 814. A hot water valve element 811*a* is arranged in the valve casing 801 to face a hot water port 803 of the valve casing 801 in such a manner that the hot water valve element 811*a* is movable in the axial direction. A cold water valve element 811*b* is arranged in the valve casing 801 to face a cold water port 804 in such a manner that the cold water valve element 811*a* is movable in the axial direction. The hot water valve element 811*b* and the cold water valve element 811*b* are separate members and thus can independently move.

Figures 16A, 16B:
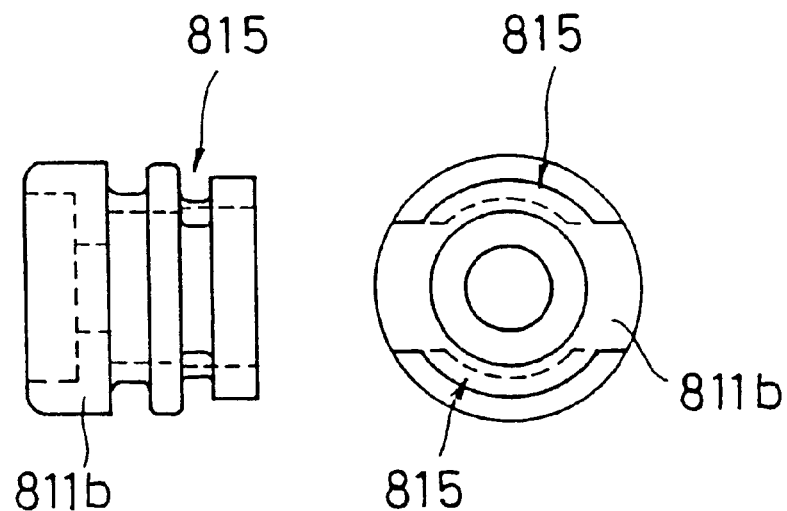
FIG. 16A is a side view showing a cold water valve element of the hot and cold water mixing device according to the tenth preferred embodiment and FIG. 16B is a rear view thereof.
Figures 17A, 17B:
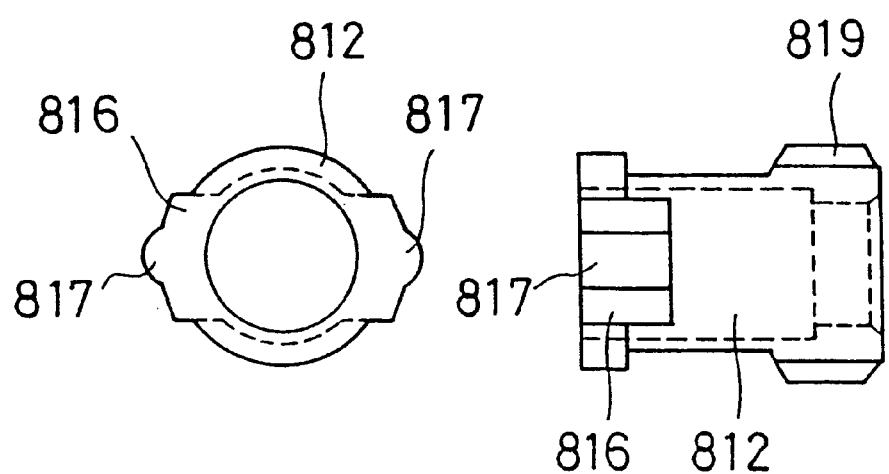
FIG. 17A is a rear view showing a regulating member of the hot and cold water mixing device according to the tenth preferred embodiment and FIG. 17B is a side view thereof.
Figure 20:
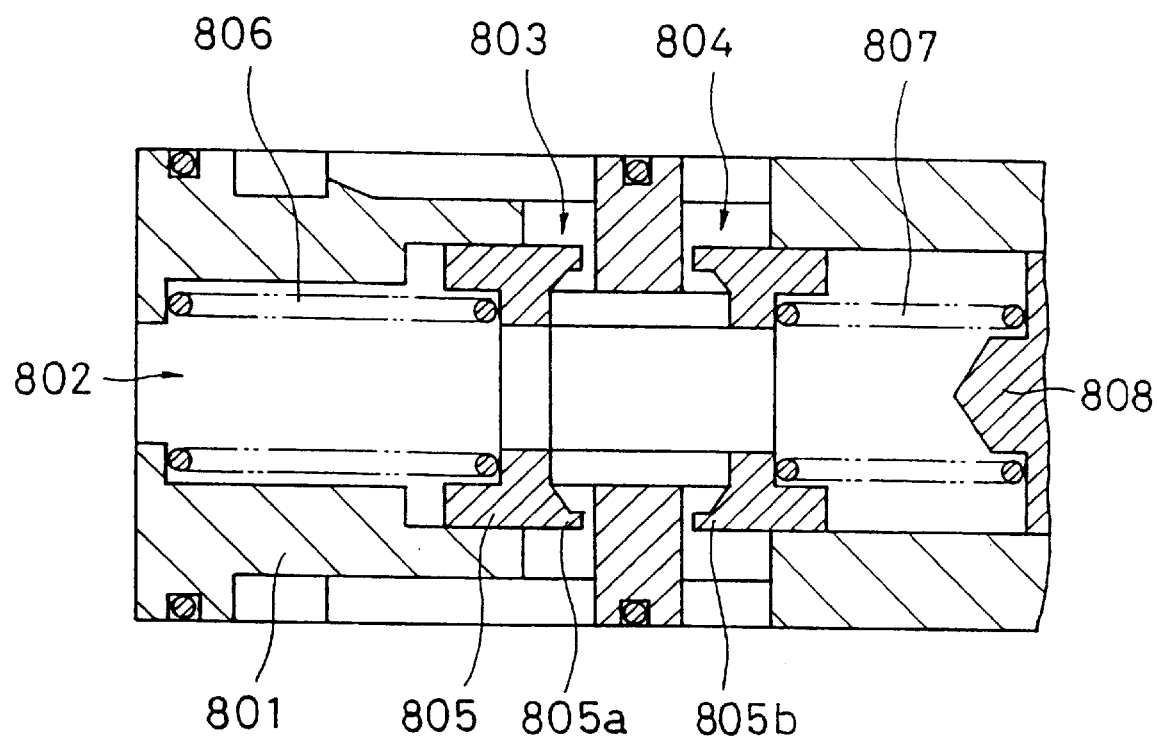
FIG. 20 is a longitudinal sectional view of a conventional hot and cold water mixing device.

The cold water valve element 811*b* has a cylindrical profile and is formed with upper and lower semicircle grooves 815 as shown in FIGS. 16A, 16B. Fitted in the grooves 815 are slide connecting members 813 as shown in FIGS. 18A, 18B. A cylindrical regulating member 812 has expanded portions 816 formed on an outer surface of a front end portion thereof as shown in FIGS. 17A, 17B. The expanded portions 816 of the regulating member 812 are fitted to rear end portions of the slide connecting members 813. The regulating member 812 has convexities 817 for preventing the rotation thereof which are formed on opposite outer surfaces of the front end portion. The convexities 817 are fitted in rail grooves 818 formed in an inner surface of the valve casing 801 in parallel with the axial direction for preventing the rotation of the regulating member 812. The regulating member 812 has an external thread 819 formed on a rear end portion thereof which is engaged with an internal thread 821 formed on an inner surface of a cylindrical portion formed on the front end side of a handle shaft 820 of the temperature regulating handle. Inside of the regulating member 812, one end of a bias spring 807 is fixed to a spring stopping member 822. The other end of the bias spring 807 is fixed to a portion inside the cold water valve element 811*b*.

Therefore, as the temperature regulating handle is turned, the rotation of the handle is transmitted to the regulating member 812 through the internal thread 821 of the handle shaft 820. Since the regulating member 812 is prevented from rotating by the fitting of the convexities 817 into the rail grooves 818 for preventing the rotation, however, the regulating member 812 moves in the axial direction.

Accordingly, the biasing force of the bias spring 807 is varied, thus changing the open area of the cold water port 804.

Figure 15A:
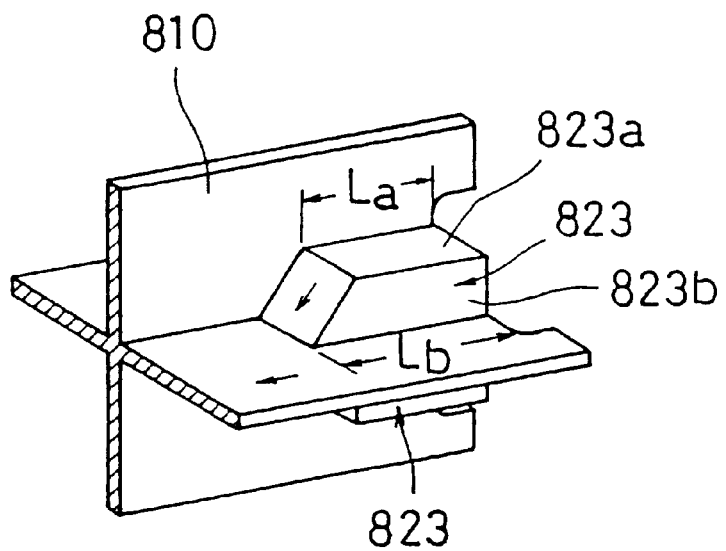
FIG. 15A is a perspective view showing a path dividing member of the hot and cold water mixing device according to the tenth preferred embodiment and FIG. 15B is a front view thereof.
Figure 15B:
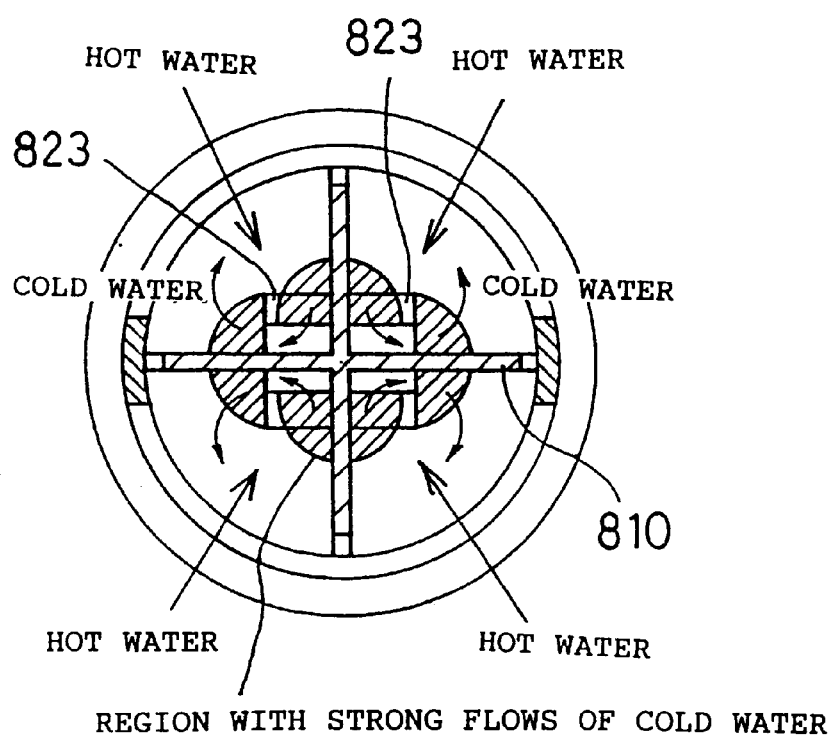

On the other hand, the hot water valve element 811a is a cylindrical member and is provided with a cruciform path dividing member 810 as shown in FIGS. 15A, 15B. The path dividing member 810 is disposed between the hot water port 803 and the cold water port 804 to divide a flow path into four paths in the circumferential direction. The path dividing member 810 has square members 823 disposed on central inner corners thereof, respectively. Each square member 823 has one surface 823a with length La as a short side of the member 823 and another surface 823b with length Lb as a long side of the member 823 wherein La<Lb. Since the path (inner chamber 802) between the ports 803 and 804 inside the valve casing 801 is divided into four paths, hot water and cold water flow with eddies in the respective divisions as shown by arrows in FIG. 15B, thereby aiding in mixing hot water and cold water. That is, the occurrence of uneven temperature can be prevented.

In addition, when the supply pressures of hot water and cold water are low, current forces of hot water and cold water flowing through the hot water port 803 and the cold water port 804 may be too poor to enter into the center. By the function of the square members 823, the flowing of cold water flowing through the water port 804 at the upstream side can be dispersed along lidge lines of the square members 823. In regions with strong flows of cold water, the direction of cold water flowing on the surface 823a and the direction of cold water flowing on the surface 823b are shifted at the terminal ends so that the water flowing on the surface 823a flows inwardly so as to apply eddies in the directions shown by arrows to the entire flowing. The eddies involve hot water flowing through the water port 803 at the downstream side whereby hot water can enter into the center to accomplish enough mixing and agitation even when the supply pressure is poor. That is, the occurrence of uneven temperature can be prevented.

The path dividing member 810 is integrally mounted to the inner surface of the hot water valve element 811a. The front end of an operating shaft 824 is attached to the rear end of the path dividing member 810. A linkage ring 825 is fitted to an outer surface of a rear end portion of the operating shaft 824. The linkage ring 825 is adapted to be in contact with the rear end of the spring stopping member 822 when the temperature of hot and cold water mixture is in the low-temperature range. When the temperature is in other temperature ranges, the linkage ring 825 is spaced apart from the rear end of the spring stopping member 812 by the biasing force of a temperature-sensitive spring 806 and can freely move in the axial direction.

The operation of the hot and cold water mixing device 809 structured as mentioned above will be described about two cases where the temperature of water mixture is set in the low-temperature range and where the temperature of water mixture is set in other than the low-temperature range. A description will now be made as regard to the case as a normal state where the temperature of water mixture is set in other than the low-temperature range. In this case, the hot water valve element 811a and the cold water valve element 811b are positioned to have predetermined open areas so that hot water and cold water flow at a predetermined ratio into an inner chamber 802 through the hot water port 803 and the cold water port 804, and are mixed to be mixture having a desired temperature to be discharged. In this case, the target temperature is set by operating or turning the temperature regulating handle shaft 820 to change the position of the regulating member 812 in the axial direction so as to vary the biasing force of the bias spring 807. Then, the biasing force of the bias spring 807 balances with the biasing force of the temperature-sensitive spring 806 so as to shift the hot water valve element 811a and the cold water valve element 811b in the axial direction, thereby varying the ratio between the open area of the hot water port 803 and the open area of the cold water port 804. In this state, when the actual temperature of water mixture deviates from the preset target temperature due to a variation in the supply pressure or the like, the temperature-sensitive spring 806 senses this deviation and changes the spring constant to change the positions of the hot water valve element 811a and the cold water valve element 811b in the axial direction. Accordingly the ratio between the opening area of the hot water port 803 and the opening area of the cold water port 804 is varied. In this manner, the temperature of water mixture can be automatically controlled.

When the temperature of water mixture to be discharged is set in the low-temperature range, the spring constant of the temperature-sensitive spring 806 made of a shape memory alloy is too low to sufficiently cope with the supply pressure of hot water. When it is desired to discharge only cold water, therefore, it is impossible to move the hot water valve element 811a in the axial direction to a position where the hot water port 803 is completely closed. For this, in the hot and cold water mixing device 809 of this embodiment, the bias spring 807 is used as a buffer for softening the operation force after the valve element is seated and, at the same time, the regulating member 812 is operated to directly control the position of the hot water valve element 811a in the axial direction. That is, as the temperature-regulating handle shaft 820 is operated in the low-temperature range, the regulating member 812 is moved in the rightward direction in FIG. 14 so as to increase the opening area of the cold water port 804. Then, the right end of the spring stopping member 822 comes in contact with the linkage ring 825 of the operating shaft 824. After that, the operating shaft 824 is linked with the hot water valve element 811a to move the hot water valve element 811a in the rightward direction in FIG. 14.

Therefore, as the temperature regulating handle shaft 820 is turned within the low-temperature range, the axial position of the hot water valve element 811a can be directly controlled via the regulating member 812. This control can be continued until the hot water valve element 811a comes in contact with the valve seat of the hot water port 803 to shut off the flow of hot water so that only cold water is discharged. In addition, the biasing force of the bias spring 807 acts to soften the operation force after the hot water valve element 811a is seated on the valve seat of the hot water valve port 803, thereby preventing the hot water valve element 811a from being broken. Further, when the operation for moving the regulating member 812 in the rightward direction in FIG. 14, i.e. the valve closing operation, is conducted after the hot water valve element 811a is seated, the regulating member 812 is engaged with the slide connecting members 813 to move the cold water valve element 811a in the rightward direction in FIG. 14 to compress the bias spring 807, thereby also preventing the hot water valve element 811a from being broken by the valve closing operation after the valve element is seated. In addition, the biasing force of the bias spring 807 after the hot water valve element 811a is seated is applied to the hot water valve element 811a in the closing direction. In brief, in this hot and cold water mixing device 809, when the target temperature is set in the low-temperature range, the bias spring 807 acts as a buffer for softening the operation force for closing the valve applied to the valve element and the axial position of the hot water valve element 811a is forcedly controlled via the regulating member 812 to close the hot water port 803, thereby allowing only cold water to be discharged. After the hot water valve element 811a is seated, the bias spring 807 acts to bias the hot water valve element 811a in the closing direction.

On the other hand, to discharge only hot water, the temperature regulating handle shaft 820 is turned in the opposite direction to largely move the regulating member 812 in the leftward direction in FIG. 14 so that the biasing force of the bias spring 807 is changed to bring the cold water valve element 811b in contact with the valve seat of the cold water port 804.

[Eleventh Preferred Embodiment]

FIG. 19 is a longitudinal sectional view schematically showing a hot and cold water mixing device 826 according to the eleventh preferred embodiment. In this hot and cold water mixing device 826, a spool valve element 827, a regulating member 812, and a handle shaft 820 are arranged in an inner chamber 802 of a valve casing 801. The spool valve element 827 has a large-diameter portion 827a and a small-diameter portion 827b. The front and rear ends of the large-diameter portion 827a function as a hot water valve portion 828 and a cold water valve portion 829, respectively. The valve casing 801 is provided with a hot water port 803 and a cold water port 804 which are formed in the circumferential surface of the valve casing 801. The positional relation between the hot water port 803 and the cold water port 804 of the hot and cold water mixing device 826 is contrary to that of the hot and cold water mixing device 809 shown in FIG. 14, that is, the hot water port 803 is positioned at the handle shaft 820 side (at the right-hand side in FIG. 19). The small-diameter portion 827b of the spool valve element 827 has a concavity 830 formed in the inner surface thereof for mounting a bias spring 807.

A front end portion of the regulating member 812 is inserted in the small-diameter portion 827b of the spool valve element 827 in such a manner the regulating member 812 can freely slide in the axial direction. The regulating member 812 has a concavity 831 formed in the outer circumferential surface of the inserted front end portion thereof for mounting the bias spring 807. The bias spring 807 is disposed between the concavity 831 of the regulating member 812 and the concavity 830 of the small-diameter portion 827b via rings 832 and 833 as spring seats which are disposed at the front and rear ends of the bias spring 807, respectively. The valve casing 801 has rail grooves 818 for preventing rotation formed in the inner surface thereof. The regulating member 812 has convexities 834 formed in a middle portion thereof which are fitted in the rail grooves 818. The regulating member 812 has an external thread 819 formed on an outer surface of a rear end portion thereof which is engaged with an internal thread 821 of the handle shaft 820.

According to the hot and cold water mixing device 826 structured as mentioned above, when the temperature of water mixture to be discharged is set at a temperature in the normal operational state not in the low-temperature range, the spring-seat ring 832 for the bias spring 807 is caught by the front end of the concavity 830 of the spool valve element 827 and is spaced apart from the front end of the concavity 831 of the regulating member 812 to form a free space therebetween. On the other hand, the spring-seat ring 833 at the rear end side is caught by the rear end of the concavity 831 of the regulating member 812 and is spaced apart from the rear end of the concavity 830 of the spool valve element 827 to form a free space therebetween.

In this case, the hot water valve portion 828 and the cold water valve portion 829 of the spool valve element 827 are positioned to have predetermined open areas so that hot water and cold water flow at a predetermined ratio into the inner chamber 802 through the hot water port 803 and the cold water port 804, and are mixed to be mixture having a desired temperature to be discharged. In this case, the target temperature is set by operating or turning the temperature regulating handle shaft 820 to change the axial position of the regulating member 812 so as to vary the biasing force of the bias spring 807 within a range obtained by the free spaces of the spring-seat rings 832 and 833. Then, the biasing force of the bias spring 807 balances with the biasing force of a temperature-sensitive spring 806 so as to shift the hot water valve portion 828 and the cold water valve portion 829 in the axial direction, thereby varying the ratio between the open area of the hot water port 803 and the open area of the cold water port 804. In this state, when the actual temperature of water mixture deviates from the preset target temperature due to a variation in the supply pressure or the like, the temperature-sensitive spring 806 senses this deviation and changes the spring constant to change the axial positions of the hot water valve portion 828 and the cold water valve portion 829. Accordingly the ratio between the opening area of the hot water port 803 and the opening area of the cold water port 804 is varied. In this manner, the temperature of water mixture can be automatically controlled.

When the temperature of water mixture to be discharged is set in the low-temperature range, the spring constant of the temperature-sensitive spring 806 made of a shape memory alloy is too low to sufficiently cope with the supply pressure of hot water. When it is desired to discharge only cold water, therefore, it is impossible to move the hot water valve portion 828 in the axial direction (in the rightward direction in FIG. 19) to a position where the hot water port 803 is completely closed. For this, in the hot and cold water mixing device 826 of this embodiment, the bias spring 807 is used as a buffer for softening the operation force after the valve element is seated and, at the same time, the hot water valve portion 828 is moved in the axial direction by the regulating member 812 so as to completely close the hot water port 803. That is, as the temperature-regulating handle shaft 820 is operated within the low-temperature range, the regulating member 812 is moved in the rightward direction in FIG. 19 so that the spring-seat ring 833 at the rear end side comes in contact with the rear end of the concavity 830 of the spool valve element 827 and is thus stopped. That is, as for the movement of the regulating member 812 in the rightward direction in FIG. 19, the regulating member 812 and the spool valve element 827 are mechanically linked via the bias spring 807.

Therefore, the rightward movement of the regulating member 812 moves the spool valve element 827 via the bias spring 807 whereby the hot water valve portion 828 of the large-diameter portion 827a is softly seated on the valve seat of the hot water port 803 because the bias spring 807 also functions as a buffer for softening the operation force applied when the valve element is seat. That is, the hot water port 803 is forcedly closed. Thus, the cold water port 804 becomes in the fully opened state, to discharge only cold water. As the regulating member 812 is further operated in the valve closing direction after the hot water valve portion 828 is seated, the spring-seat ring 832 is pulled by the front end of the concavity 831 of the regulating member 812 in the rightward direction in FIG. 19 so as to compress the bias spring 807, thereby preventing the hot water valve portion 828 from being broken. In addition, the biasing force of the bias spring 807 after the hot water valve portion 828 is seated is applied to the hot water valve portion 828 in the closing direction. As mentioned above, also in this embodiment, when the target temperature is set in the low-temperature range, the bias spring 807 functions as a buffer for softening the operation force for closing the valve applied to the valve element. In addition, the spool valve element 827 is forcedly moved by the regulating member 812 via the bias spring 807 to completely close the hot water port 803 by the hot water valve element 828. After the hot water valve portion 828 is seated, the bias spring 807 acts to bias the hot water valve portion 828 in the closing direction. The spring constant required for the temperature-sensitive spring 806 can be reduced, thereby reducing the entire size and restricting the increase in the manufacturing cost.

By the way, the present invention is not limited to the aforementioned preferred embodiments, variable modifications may be made. For instance, the cold water valve element 811b and the regulating member 812 disposed in the inner cavity 802 of the valve casing may be integrally formed, or the regulating member 812 and the slide connecting member 813 may be integrally formed.

As described above, a valve element is biased by a temperature-sensitive spring and a bias spring. The valve member is formed with a contact portion which can come in directly or indirectly contact with a regulating-member contact surface of the bias spring. The regulating member is provided with a contact portion which can come in directly or indirectly contact with a valve-element contact surface of the bias spring. Therefore, the valve element is directly or indirectly linked with the regulating member for varying the biasing force of the bias spring. When the target temperature is set in a low-temperature range, the bias spring functions as a buffer for softening the operation force applied to the valve element after the valve element is seated and, during this, the valve element can be moved in the axial direction via the regulating member. In this manner, a hot water port can be forcedly closed, thereby allowing only cold water to be discharged. After the valve element is seated, the bias spring acts to bias the valve element in the closing direction, thus enabling suitable operation for closing the valve element.

Therefore, a temperature-sensitive spring with a reduce spring constant can be employed, thereby preventing the size of a faucet from being increased due to the increased size of the temperature-sensitive spring and thus restricting the increase in the manufacturing cost.

What is claimed is:

1. A hot and cold water mixing device comprising:
   a cylindrical valve body having a cold water valve seat and a hot water valve seat;
   a valve element which is slidable in an axial direction of said valve body and which can be seated on said cold water valve seat and said hot water valve seat;
   a temperature-sensitive spring for biasing said valve element in a direction toward said hot water valve seat;
   a bias spring for biasing said valve element in a direction toward said cold water valve seat; and
   a temperature setting member for moving said bias spring in the axial direction of said valve body,
   wherein said hot and cold water mixing device further comprises biasing force changing means for changing a biasing force of said bias spring,
   a biasing force when said valve element is positioned in a range for discharging medium-temperature water mixture being different from a biasing force when said valve element is positioned in a range for discharging low-temperature water mixture or a range for discharging high-temperature water mixture.

2. A hot and cold water mixing device as claimed in claim 1, wherein a plurality of bias springs is provided as said bias spring,
   said biasing force changing means controls such that the biasing force of only a part of said bias springs acts on said valve element when the valve element is positioned in the range for discharging low-temperature water mixture or the range for discharging high-temperature water mixture and such that the biasing force of all of said bias springs serially acts on said valve element when the valve element is positioned in the range for discharging medium-temperature water mixture.

3. A hot and cold water mixing device as claimed in claim 2, wherein said valve element is supported by a main shaft arranged coaxially with said valve body, and said main shaft being slidable in the axial direction of said valve body;
   wherein said temperature setting member comprises:
   a rotational shaft arranged coaxially with said main shaft and having an internal thread formed in an inner surface thereof,
   a cylindrical slide shaft arranged coaxially with said main shaft and having an external thread to be engaged with said internal thread;
   a distal end collar formed on a distal end and a proximal end collar formed on a proximal end of said slide shaft, the distal end being located apart from the valve element and the proximal end being located near the valve element;
   a hook which is axially movably coupled to said slide shaft, and is prevented from moving in a direction toward the valve element when engaged with said proximal end collar; and
   a slide ring which is axially movably coupled to said main shaft and disposed between said hook and the valve element in such a manner as to be in contact with a collar-like stopper disposed on a middle portion in the longitudinal direction of said main shaft and to be in contact with said hook, and:
   wherein a first bias spring is disposed between said slide ring and the valve element in the compressed state, and a second bias spring is disposed between said hook and the distal end collar in the compressed state.

4. A hot and cold water mixing device as claimed in claim 3, wherein said changing means comprises:
   said main shaft extending from said valve element;
   a flange-like stopper disposed on an end of said main shaft;
   said collar-like stopper disposed on the middle portion of said main shaft;
   a stopper ring biased by said second bias spring in a direction to be pressed against the distal end collar of the slide shaft; and
   said slide ring biased by said first bias spring in a direction to be pressed against the hook,
   whereby when the valve element is positioned in the range for discharging medium-temperature water mixture, said flange-like stopper and the stopper ring are spaced apart from each other, said stopper ring is pressed against the distal end collar of the slide shaft by the second bias spring, said collar-like stopper and the slide ring are spaced apart from each other, and said slide ring is pressed against the hook by the first bias spring, and when the valve element is positioned in the range for discharging low-temperature water mixture, said flange-like stopper is engaged with said stopper ring and said hook is engaged with the proximal end collar so as to restrict a movement of the hook in a direction toward the valve body, whereby a biasing force of the second bias spring is applied to the valve element via the stopper ring and the main shaft in the same direction of the biasing force of said temperature-sensitive spring, and said collar-like stopper is engaged with the slide ring so that a biasing force of the first bias spring does not act on the valve element and the slide shaft.

5. A hot and cold water mixing device as claimed in claim 2, wherein said temperature setting member comprises:

a rotational shaft arranged coaxially with said main shaft and having an internal thread formed in an inner surface thereof;

a cylindrical slide shaft arranged coaxially with a rotational shaft and having an external thread to be engaged with said internal thread;

a clutch column arranged movably in the axial direction of said valve body;

a first bias spring disposed between said clutch column and the valve element in a compressed state; and a second bias spring disposed between the clutch column and the slide shaft in a compressed state.

6. A hot and cold water mixing device as claimed in claim 5, wherein when the valve element is positioned in the range for discharging low-temperature water mixture, the clutch column and the slide shaft are engaged with each other so as to restrict a movement of the clutch column in a direction toward the valve element.

7. A hot and cold water mixing device as claimed in claim 5, wherein when the valve element is positioned in the range for discharging high-temperature water mixture, the clutch column is pressed against the valve element or the slide shaft so as to restrict a movement of the clutch column in the axial direction.

8. A hot and cold water mixing device as claimed in claim 5, wherein said valve element has a pair of flanges spaced apart from each other in the axial direction, and said clutch column has a collar disposed between said flanges.

9. A hot and cold water mixing device as claimed in claim 8, wherein when the valve element is positioned in the range for discharging high-temperature water mixture, said collar of the clutch column is pressed against one, near the valve element, of said flanges so as to restrict the movement of the clutch column in the axial direction.

10. A hot and cold water mixing device as claimed in claim 8, wherein when the valve element is positioned in the range for discharging low-temperature water mixture, said collar of the clutch column is pressed against one, apart from the valve element, of said flanges so as to restrict the movement of the clutch column in the axial direction.

11. A hot and cold water mixing device as claimed in claim 8, wherein when the valve element is positioned in the range for discharging high-temperature water mixture, the clutch column is pressed against the slide shaft so as to restrict the movement of the clutch column in the axial direction.

12. A hot and cold water mixing device as claimed in claim 1, wherein a plurality of bias springs is provided as said bias spring, said biasing force changing means controls such that when the valve element is positioned in the range for discharging medium-temperature water mixture, serially combined biasing forces of the respective bias springs are applied to the valve element in a direction opposite to that of a biasing force of the temperature-sensitive spring, and when the valve element is positioned in the range for discharging low-temperature water mixture, the biasing force of a part of the bias springs is applied to the valve element in the same direction of the biasing force of the temperature-sensitive spring.

13. A hot and cold water mixing device as claimed in claim 12, wherein said temperature setting member comprises:

a rotational shaft arranged rotatably about its axis and having an internal thread formed in the inner surface thereof;

a cylindrical slide shaft arranged coaxially with said rotational shaft and having an external thread to be engaged with said internal thread;

a clutch column arranged movably in an axial direction of said slide shaft;

a first bias spring disposed between said clutch column and the valve element in a compressed state; and a second bias spring disposed between clutch column and the slide shaft in a compressed state.

14. A hot and cold water mixing device as claimed in claim 13, further comprising an engaging member for engaging the slide shaft and the clutch column when a temperature is set at a low temperature by said temperature setting member, wherein said changing means comprises:

a projecting shaft extending from said valve element toward the slide shaft;

a stopper disposed on an end of said projecting shaft; and a washer biased by said second bias spring in a direction to be pressed against the slide shaft, wherein when the valve element is positioned in the range for discharging high-temperature water mixture or the range for discharging medium-temperature water mixture, said stopper and the washer are spaced apart from each other and said washer is pressed against the slide shaft by the second bias spring, and when the valve element is positioned in the range for discharging low-temperature water mixture, said stopper is engaged with said washer and said engaging member restricts a movement of the clutch column in a direction toward the valve body, whereby the biasing force of the second bias spring is applied to the valve element via the washer and the projecting shaft in the same direction of a biasing force of said temperature-sensitive spring.

15. A hot and cold water mixing device as claimed in claim 14, wherein when the valve element is positioned in the range for discharging high-temperature water mixture, the clutch column comes in contact with the valve element or the slide shaft so as to restrict the movement of the clutch column in the axial direction.

16. A hot and cold water mixing device as claimed in claim 13, further comprising an engaging member for engaging the slide shaft and the clutch column when the temperature is set at a low temperature by said temperature setting member, wherein said changing means comprises:

a projecting shaft extending from said valve element toward the slide shaft;

a first stopper disposed on an end of said projecting shaft;

a second stopper disposed on a middle portion of said projecting shaft;

a first washer biased by said second bias spring in a direction to be pressed against the slide shaft; and a second washer biased by said first bias spring in a direction to be pressed against the clutch column, whereby when the valve element is positioned in the range for discharging medium-temperature water mixture, said first stopper and the first washer are spaced apart from each other and said first washer is pressed against the slide shaft by the second bias spring while the second stopper and the second washer are spaced apart form each other and the said second washer is pressed against the clutch column by the first bias spring, and when the valve element is positioned in the range for discharging low-temperature water mixture, said first stopper is engaged with said first washer and said engaging member restricts s movement of the clutch column in a direction toward the valve body, whereby a biasing force of the second bias spring is applied to the valve element via the first washer and the projecting shaft in the same direction of a biasing force of said temperature-sensitive spring, while said second stopper is engaged with said second washer whereby a biasing force of the first bias spring does not act on the valve element and the slide shaft.

17. A hot and cold water mixing device as claimed in claim 13, further comprising an engaging member for engaging the clutch column and the valve element when the temperature is set at a low temperature by said temperature setting member, wherein said changing means comprises:

a projecting shaft extending from said slide shaft toward said valve element;

a stopper disposed on an end of said projecting shaft; and a washer biased by said first bias spring in a direction to be pressed against the valve element, whereby when the valve element is positioned in the range for discharging high-temperature water mixture or the range for discharging medium-temperature water mixture, said stopper and the washer are spaced apart from each other and said washer is pressed against the valve element by the first bias spring, and when the valve element is positioned in the range for discharging low-temperature water mixture, said stopper is engaged with said washer and said engaging member restricts a movement of the clutch column in a direction apart from the valve body, whereby a biasing force of the first bias spring is applied to the valve element via the washer, the projecting shaft, and the clutch column in the same direction of a biasing force of said temperature-sensitive spring.

18. A hot and cold water mixing device as claimed in claim 17, wherein when the valve element is positioned in the range for discharging high-temperature water mixture, the clutch column comes in contact with the valve element or the slide shaft so as to restrict a movement of the clutch column in the axial direction.

19. A hot and cold water mixing device as claimed in claim 13, further comprising an engaging member for engaging the clutch column and the valve element when the temperature is set at a low temperature by said temperature setting member, wherein said changing means comprises:

a projecting shaft extending from said slide shaft toward said valve element;

a first stopper disposed on an end of said projecting shaft;

a second stopper disposed on a middle portion of said projecting shaft;

a first washer biased by said first bias spring in a direction to be pressed against the valve element; and a second washer biased by said second bias spring in a direction to be pressed against the clutch column, whereby when the valve element is positioned in the range for discharging medium-temperature water mixture, said first stopper and the first washer are spaced apart from each other and said first washer is pressed against the valve element by the first bias spring, while said second stopper and the second washer are spaced apart from each other and said second washer is pressed against the clutch column by the second bias spring, and when the valve element is positioned in the range for discharging low-temperature water mixture, said first stopper is engaged with said first washer and said engaging member restricts a movement of the clutch column in a direction apart from the valve body, whereby a biasing force of the first bias spring is applied to the valve element via the first washer, the projecting shaft, and the clutch column in the same direction of a biasing force of said temperature-sensitive spring, while said second stopper is engaged with said second washer whereby a biasing force of the second bias spring does not act on the valve element and the slide shaft.

20. A hot and cold water mixing device as claimed in claim 1, wherein a plurality of bias springs is provided as said bias spring, said biasing force changing means for changing biasing forces of the bias springs acting on said valve element controls such that when the valve element is positioned in the range for discharging high-temperature water mixture, total biasing forces of all of the bias springs are applied to the valve element in a direction opposite to that of the biasing force of the temperature-sensitive spring;

when the valve element is positioned in the range for discharging medium-temperature water mixture, the biasing force of a part of the bias springs is applied to the valve element in a direction opposite to that of the biasing force of the temperature-sensitive spring; and when the valve element is positioned in the range for discharging low-temperature water mixture, the valve element is moved directly by said temperature setting member.

21. A hot and cold water mixing device as claimed in claim 20, wherein said valve element is supported by a main shaft arranged coaxially with said valve body, and said main shaft being slidable in the axial direction of said valve body;

wherein said temperature setting member comprises:

a rotational shaft arranged rotatably about its axis and having an internal thread formed in an inner surface thereof; and a cylindrical slide shaft arranged coaxially with said rotational shaft and having an external thread to be engaged with said internal thread, wherein said changing means comprises:

a projecting shaft extending from said main shaft toward said slide shaft;

a stopper disposed on an end of said projecting shaft; and a washer capable of coming in contact with said stopper, wherein a first bias spring is disposed between said washer and the valve element and a second bias spring is disposed between said slide shaft and the valve element, whereby when the valve element is positioned in the range for discharging high-temperature water mixture, said stopper and the washer are spaced apart from each other and the washer and the slide shaft are engaged with each other whereby the first bias spring is subjected to a reaction force by the slide shaft and thus biases the valve element, when the valve element is positioned in the range for discharging medium-temperature water mixture, the stopper is engaged with the washer wherein an application of the biasing force of the first bias spring to the valve element is cancelled; and when the valve element is positioned in the range for discharging low-temperature water mixture, the valve element and the slide shaft are engaged with each other so that the valve element and the slide shaft move integrally with each other.

22. A hot and cold water mixing device as claimed in claim 1, wherein a plurality of bias springs is provided as said bias spring, said biasing force changing means for changing biasing forces of the bias springs acting on said valve element controls such that when the valve element is positioned in the range for discharging high-temperature water mixture, the total biasing forces of all of the bias springs are applied to the valve element in a direction opposite to that of the biasing force of the temperature-sensitive spring;

when the valve element is positioned in the range for discharging medium-temperature water mixture, the biasing force of a part of the bias springs is applied to the valve element in a direction opposite to that of the biasing force of the temperature-sensitive spring; and when the valve element is positioned in the range for discharging low-temperature water mixture, the biasing force of other bias spring is applied to the valve element in the same direction of the biasing force of the temperature-sensitive spring.

23. A hot and cold water mixing device as claimed in claim 22, wherein said temperature setting member comprises:

a rotational shaft arranged rotatably about its axis and having an internal thread formed in an inner surface thereof; and a cylindrical slide shaft arranged coaxially with said rotational shaft and having an external thread to be engaged with said internal thread, and further comprising:

a second bias spring disposed between the slide shaft and the valve element;

first and second collars disposed on a column and spaced apart from each other in the axial direction;

a first washer and a second washer disposed to face said first collar and said second collar, respectively;

a first bias spring disposed between said first washer and said second washer in a compressed state;

a collar disposed on said slide shaft which is engaged with said first washer to press said first washer in the direction apart from the valve element when the slide shaft is moved in a direction apart from the valve element; and a step disposed on said slide shaft which is engaged with said second washer to press said second washer in a direction toward the valve element when the slide shaft is moved in a direction toward the valve element.

24. A control mechanism of a hot and cold water mixing device, comprising:

a main body having an inner chamber, and a hot water port and a cold water port formed in a circumferential surface thereof, a valve element disposed in the inner chamber of the main body and having an operating shaft and a contact portion at one end thereof, a temperature-sensitive spring disposed in the inner chamber for biasing the valve element at one side thereof, a bias spring disposed in the inner chamber for biasing the valve element at a side opposite to the temperature-sensitive spring and allowing the operating shaft to extend inside the bias spring, said bias spring having at one side a regulating member contact surface which contacts at least indirectly the contact portion of the valve element, and a valve element contact surface at the other side, and a regulating member associated with the valve element for controlling a position of the valve element and changing a biasing force of the bias spring, said regulating member being disposed at a side of the bias spring away from the valve element to change a flowing rate of hot water and cold water to obtain water mixture at a desired temperature, and having a contact surface at least indirectly contacting the valve element contact surface of the bias spring so that when the hot water port is closed, the bias spring and the temperature-sensitive spring act on the valve element to securely close the hot water port.

25. A control mechanism of a hot and cold water mixing device as claimed in claim 24, wherein said valve element includes a hot water valve element located adjacent to the hot water port and having said operating shaft, and a cold water valve element located adjacent to the cold water port and spaced from the hot water valve element, said cold water valve element contacting the valve element contact surface of the bias spring.

* * * * *